United States Patent
Suzuki et al.

(10) Patent No.: US 10,545,890 B2
(45) Date of Patent: Jan. 28, 2020

(54) INFORMATION PROCESSING DEVICE, INFORMATION PROCESSING METHOD, AND PROGRAM

(71) Applicant: FUJITSU LIMITED, Kawasaki-shi, Kanagawa (JP)

(72) Inventors: Kosuke Suzuki, Ota (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/206,181

(22) Filed: Nov. 30, 2018

(65) Prior Publication Data

US 2019/0196993 A1    Jun. 27, 2019

(30) Foreign Application Priority Data

Dec. 26, 2017 (JP) .................................. 2017-248925

(51) Int. Cl.
*G06F 3/00* (2006.01)
*G06F 13/22* (2006.01)
(Continued)

(52) U.S. Cl.
CPC .......... *G06F 13/225* (2013.01); *G06F 9/4818* (2013.01); *G06F 9/4825* (2013.01); *G06F 9/4881* (2013.01); *G06F 13/26* (2013.01)

(58) Field of Classification Search
CPC .... G06F 13/225; G06F 9/4881; G06F 9/4825; G06F 13/26; G06F 9/4818
See application file for complete search history.

(56) References Cited

U.S. PATENT DOCUMENTS 4,484,275 A * 11/1984 Katzman ............. G06F 12/1458
710/40
5,471,618 A * 11/1995 Isfeld ...................... G06F 13/26
340/3.51
(Continued)

FOREIGN PATENT DOCUMENTS

JP    2009-238001    10/2009
JP    2014-531081    11/2014
(Continued)

OTHER PUBLICATIONS

"Polling Watchdog: Combining Polling and Interrupts for Efficient Message Handling", Proceedings of the 23rd. Annual Symposium on Computer Architecture. Philadelphia, May 22-24, 1996, Proceedings of the Annual Symposium on Computer Architecture, New York, ACM/IEEE, US, vol. Symp. 23, May 22, 1996 (May 22, 1996).*

*Primary Examiner* — Jing-Yih Shyu
(74) *Attorney, Agent, or Firm* — Fujitsu Patent Center

(57) ABSTRACT

An information processing device includes a memory, and a plurality of processor cores that access the memory. The plurality of processor cores respectively executes processes to be executed by the plurality of processor cores in accordance with execution priority levels of the processes. When a polling process for repeatedly determining whether reception data for input/output processing is received is underway in one of the plurality of processor cores, the plurality of processor cores respectively executes the input/output processing in response to a determination, made by the polling process, that the reception data have been received, and when the polling process is not underway in any of the plurality of processing cores, the plurality of processor cores (Continued)

respectively executes the input/output processing in response to a processor interrupt issued upon reception of the reception data.

11 Claims, 18 Drawing Sheets

(51) Int. Cl.
*G06F 13/26* (2006.01)
*G06F 9/48* (2006.01)

(56) References Cited

U.S. PATENT DOCUMENTS

| | | | |
|---|---|---|---|
| 6,105,102 A * | 8/2000 | Williams | G06F 13/24 |
| | | | 327/142 |
| 9,218,203 B2 * | 12/2015 | Yu | H04L 47/2441 |
| 9,448,864 B2 * | 9/2016 | Kim | G06F 9/4831 |
| 2002/0073262 A1 * | 6/2002 | Godfrey | G06F 9/32 |
| | | | 710/260 |
| 2006/0047856 A1 * | 3/2006 | Tripathi | H04L 67/1002 |
| | | | 709/250 |
| 2006/0224785 A1 * | 10/2006 | Nakashima | G06F 13/126 |
| | | | 710/48 |
| 2008/0114937 A1 * | 5/2008 | Reid | G06F 11/362 |
| | | | 711/117 |
| 2009/0248931 A1 | 10/2009 | Kato | |
| 2010/0223411 A1 * | 9/2010 | Yamaguchi | G06F 13/128 |
| | | | 710/261 |
| 2013/0024875 A1 * | 1/2013 | Wang | G06F 13/22 |
| | | | 719/318 |
| 2014/0115603 A1 | 4/2014 | Yu et al. | |
| 2014/0173619 A1 * | 6/2014 | Nakashima | G06F 9/4893 |
| | | | 718/104 |
| 2019/0018674 A1 | 1/2019 | Tamura et al. | |

FOREIGN PATENT DOCUMENTS

| | | |
|---|---|---|
| JP | 2019-20853 A | 2/2019 |
| WO | 2008126138 | 10/2008 |
| WO | 2009060530 | 5/2009 |
| WO | 2014/000450 | 1/2014 |

* cited by examiner

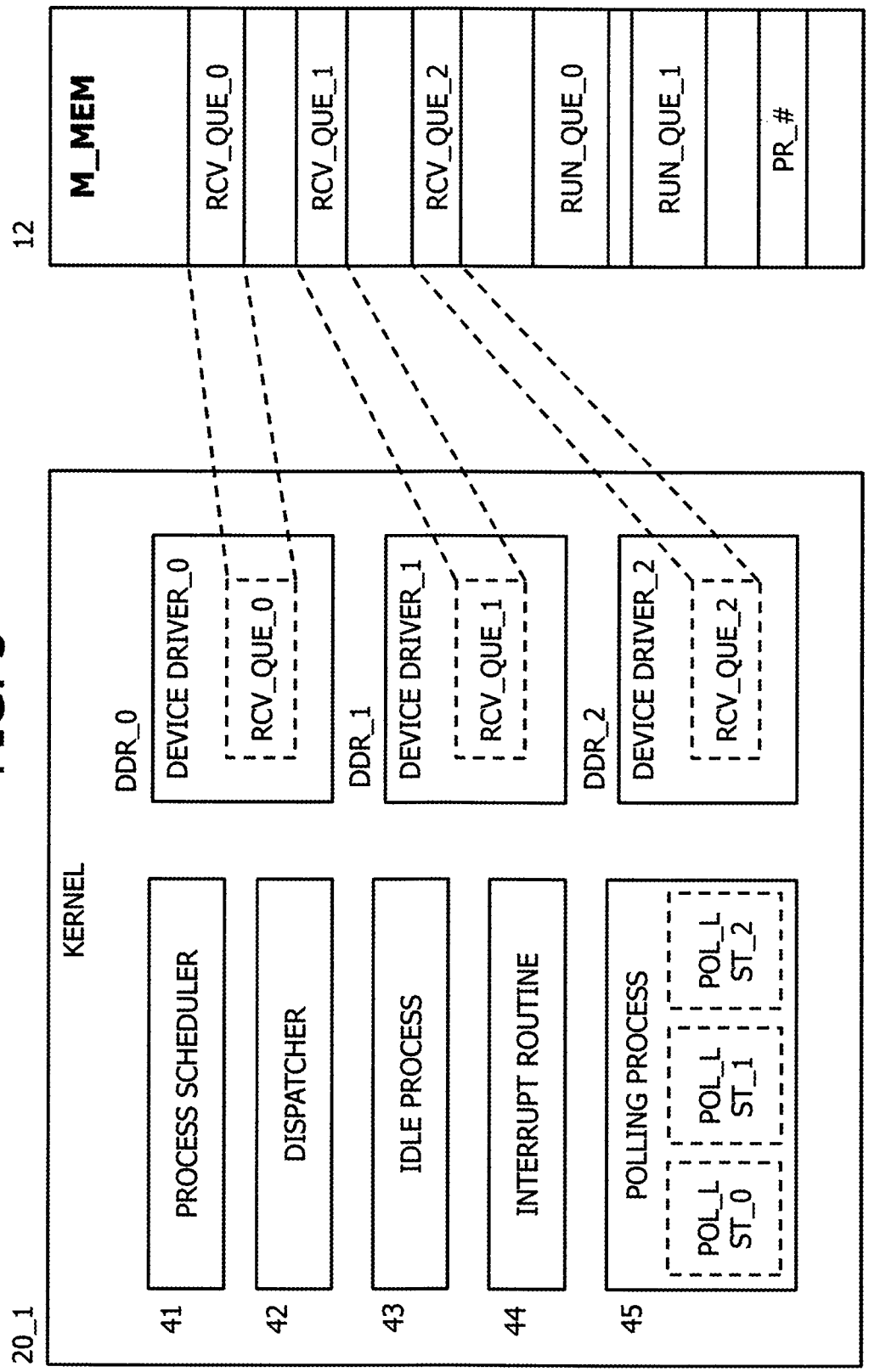

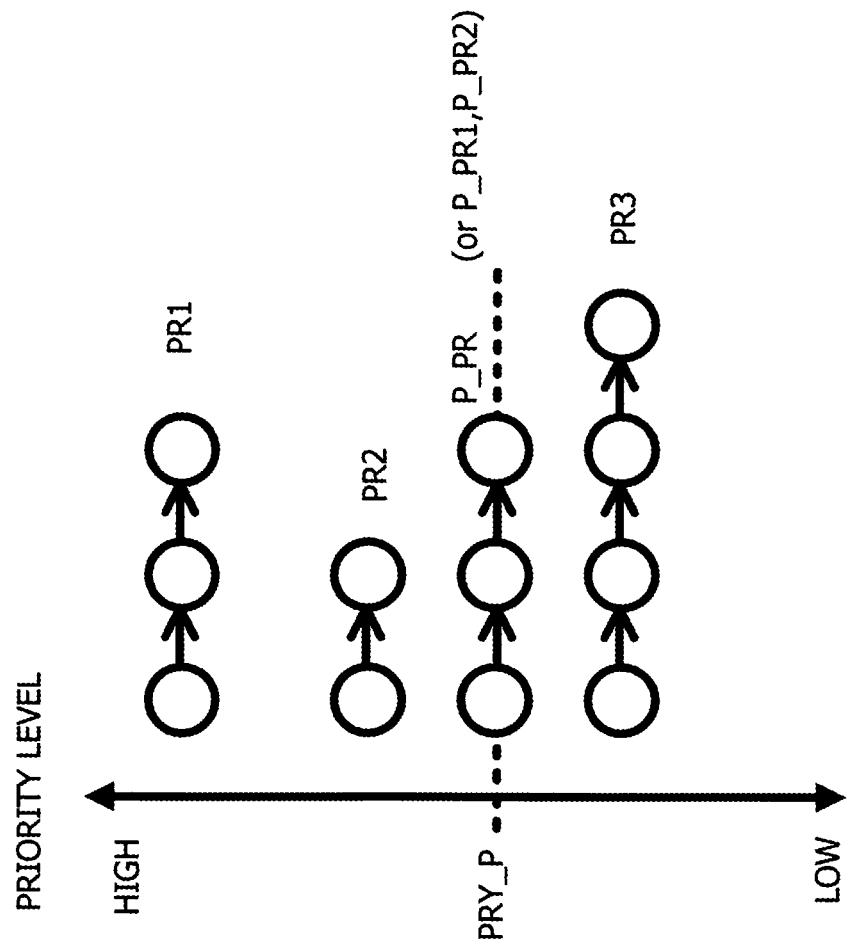

INFORMATION PROCESSING DEVICE, INFORMATION PROCESSING METHOD, AND PROGRAM

CROSS-REFERENCE TO RELATED APPLICATION

This application is based upon and claims the benefit of priority of the prior Japanese Patent Application No. 2017-248925, filed on Dec. 26, 2017 the entire contents of which are incorporated herein by reference.

FIELD

The present invention relates to an information processing device, an information processing method, and a program.

BACKGROUND

An information processing device such as a computer or a server executes I/O processing for receiving data from a peripheral device or another node (a computer or a server). As a method for detecting a reception event relating to the data from the peripheral device or the other node during the I/O processing, either processing for polling a reception queue at intervals of a predetermined time or processing for generating a CPU interrupt at the time of the data reception event may be employed.

Japanese National Publication of International Patent Application No. 2014-531081, International Publication Pamphlet No. 2009/060530, Japanese Laid-open Patent Publication No. 2009-238001, International Publication Pamphlet No. 2008/126138, and Japanese Patent Application No. 2017-136514 (filed on Jul. 12, 2017) describe I/O processing. Note, however, that Japanese Patent Application No. 2017-136514 (filed on Jul. 12, 2017) is not published, so not known.

SUMMARY

Processing for detecting the generation of a reception event by means of polling is executed by a kernel of an operating system (OS), and in contrast to processing involving a CPU interrupt, processing (a context switch) for switching a context in a register in the CPU does not occur during the processing. As a result, the I/O processing can be executed at high speed following reception. However, a CPU executes polling processing repeatedly, leading to an increase in the load on the CPU, and as a result, the efficiency of other processing decreases.

In processing for detecting the generation of a reception event by means of a CPU interrupt, the CPU does not involve such repetitive processing as in the processing involving polling processing, and therefore the load on the CPU is small. As a result, the efficiency of the other processing improves. However, when the CPU interrupt is generated following the occurrence of a reception event, context switch processing is executed on the CPU by an interrupt handler, and therefore the I/O processing is not executed at high speed following reception.

According to an one aspect of the present embodiment, an information processing device includes: a memory; and a plurality of processor cores capable of accessing the memory, wherein the plurality of processor cores respectively: executes processes to be executed by the plurality of processor cores in accordance with execution priority levels of the processes; when a polling process for repeatedly determining, by means of polling, whether or not reception data for input/output processing is received is underway in one of the plurality of processor cores, executes the input/output processing in response to a determination, made by the polling process, that the reception data have been received; and when the polling process is not underway in any of the plurality of processing cores, executes the input/output processing in response to a processor interrupt issued upon reception of the reception data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating an example of programs of the kernel in the OS that is executed by the processor according to this embodiment.

FIG. 17 is a view illustrating a relationship between normal processes and the polling process according to a fourth embodiment.

DESCRIPTION OF EMBODIMENTS

Figure 1:
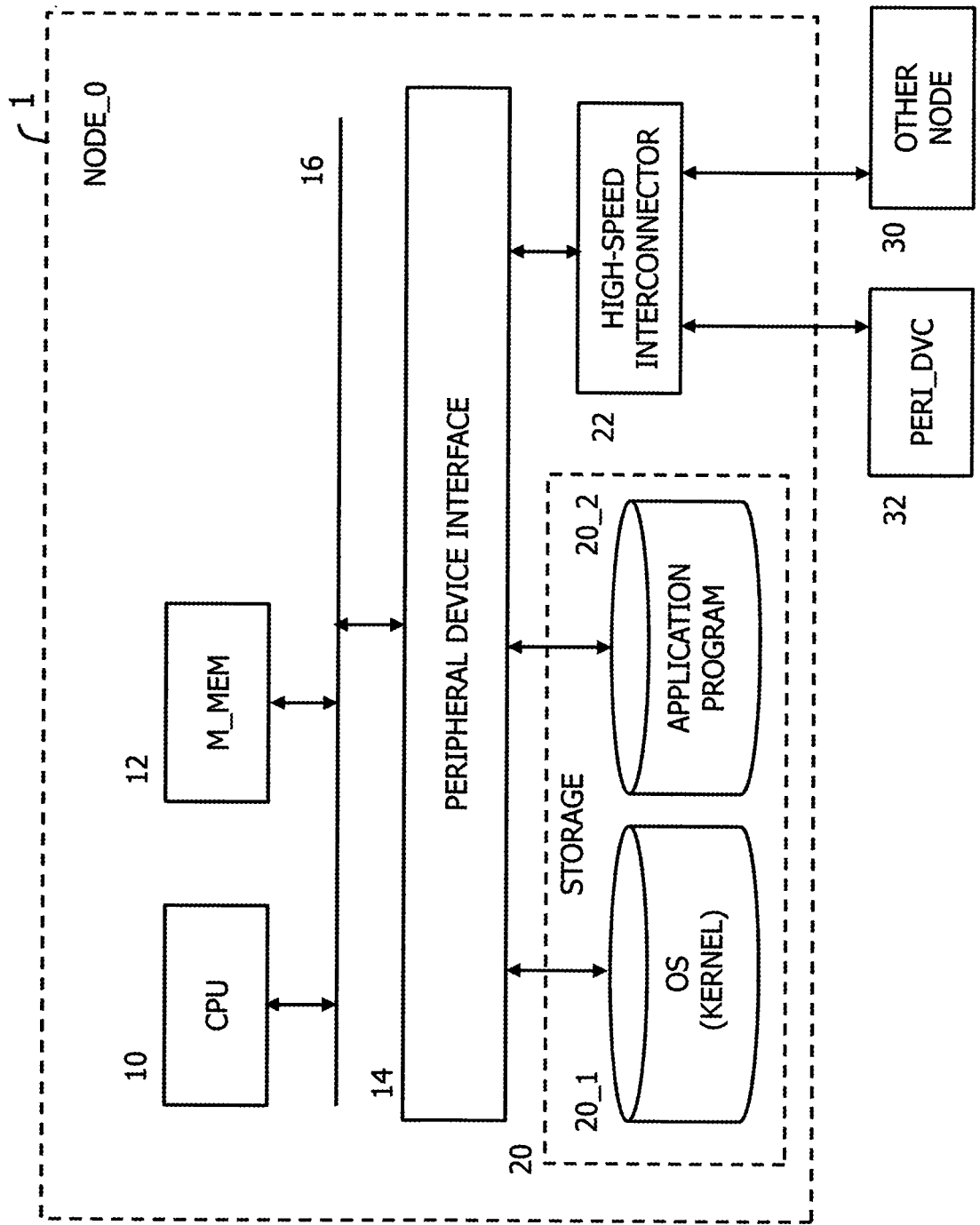
FIG. 1 is a schematic view illustrating a configuration of an information processing device according to an embodiment.

FIG. 1 is a schematic view illustrating a configuration of an information processing device according to an embodiment. The information processing device (a computer, a server, or a node) 1 includes a central processing unit (CPU) chip 10 that is an arithmetic processing device, a main memory 12 such as a DRAM, a peripheral device interface 14, and a bus 16 connecting these components. The CPU chip 10 will be referred to hereafter as a processor. Further, the computer 1 also serves as a node NODE_0.

The computer 1 also includes large-capacity storage devices 20, 20_1, 20_2 such as hard disk HDDs or solid state drive (SSDs), and the storage devices are connected to the peripheral device interface 14. An OS, an application program, and so on are stored respectively in the storage devices 20_1, 20_2 so that when the computer 1 is activated, the OS and the application program are expanded to the main memory and executed by the processor 10.

A high-speed interconnector 22 that is a network device is connected to the peripheral device interface 14. A separate peripheral device 32 such as a network interface card (NIC) and another node 30 are connected to the computer 1 via the high-speed interconnector 22.

In an high performance computer (HPC) such as a supercomputer, the plurality of nodes NODE_0, 30 are connected to each other via a high-speed interconnector 22 constituted by a network device, such as InfiniBand, so that data are transferred between the nodes at high speed. Further, in an HPC, an solid state drive (SSD) substituted for a hard disk is connected to the peripheral device interface 14 via a high-speed interface such as NVM Express (non-volatile memory express, (NVMe)) in order to reduce latency with respect to the SSD.

As described above, the HPC performs high-speed I/O processing with the peripheral device or the other nodes via the high-speed interconnector or the high-speed interface.

There are two methods for detecting reception of data or a packet in response to an I/O request issued by the processor 10 in the I/O processing, first, a polling process, in which a kernel of the OS executed by the processor periodically checks whether or not data or a packet has been received in a reception queue, and second, processing corresponding to a CPU interrupt issued by a memory control circuit provided in the peripheral device or the processor upon the completion of reception in the reception queue The processing for detecting a reception event by means of a polling process is executed by the kernel of the OS, and in contrast to a CPU interrupt, does not include processing for switching a context in registers of the CPU, with the result that the I/O processing is executed at high speed. Since the CPU executes the polling process, however, the load on the CPU increases, and as a result, the execution efficiency of other processing decreases.

Meanwhile, in the processing for detecting a reception event by means of a CPU interrupt, the CPU does not have to execute the polling process repeatedly and therefore the load on the CPU is small. However, when the CPU interrupt is generated following the occurrence of a reception event, a context switch is performed in the CPU by an interrupt handler, making it impossible to realize an increase in the speed of the I/O processing.

Hence, to realize high-speed I/O processing, the HPC preferably detects a reception event by having the kernel perform a polling process. In this case, however, the load on the CPU increases, leading to a reduction in the execution efficiency of other processes.

Figure 2:
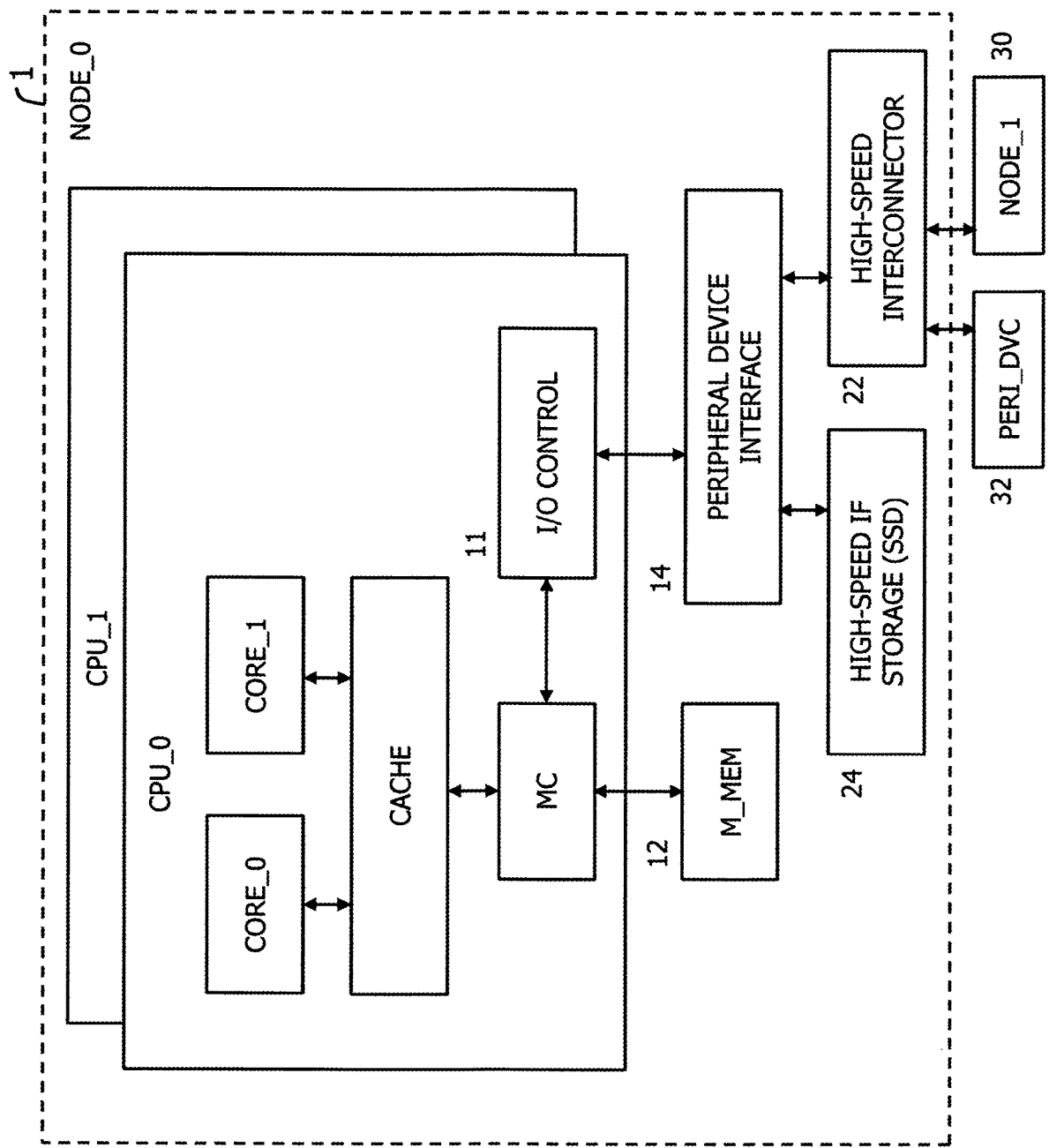
FIG. 2 is a view illustrating an internal configuration of processors CPU_0, CPU_1 of the computer 1.

FIG. 2 is a view illustrating an internal configuration of processors CPU_0, CPU_1 of the computer 1. The processor CPU_0 includes a plurality of cores CORE_0, CORE_1, and the cores fetch and decode instructions, load data in response to an I/O request, and execute calculation processing on the data. The number of cores in FIG. 2 is merely an example. The processor CPU_0 also includes a cache CACHE having a cache control circuit and a cache memory, a memory controller MC for controlling access to the main memory 12, and an I/O control circuit 11 that is an interface for an I/O request relating to a peripheral device or another node on the exterior of the processor.

In the example depicted in FIG. 2, a high-speed storage 24 constituted by an SSD having a high-speed interface is connected to the peripheral device interface 14, and similarly to FIG. 1, the high-speed interconnector 22 is also connected to the peripheral device interface 14. The peripheral device 32 and the other node 30 are connected to the high-speed interconnector 22.

In FIG. 2, when the cores CORE_0, CORE_1 issue an I/O request and a cache miss occurs in the cache CACHE, the cache control circuit issues an I/O request to an I/O request destination. When the I/O request destination is the main memory, an I/O request command is issued to the main memory M_MEM via the memory controller MC. When the I/O request destination is the high-speed storage 24, the peripheral device 32, or the other node 30, meanwhile, the I/O request is issued to the I/O request destination via the memory controller MC.

When the I/O request destination is the main memory, data read from the main memory are transmitted back to the cache control circuit of the cache CACHE and registered in the cache memory, and the data are also transmitted back to the core of the I/O request source. Further, when the I/O request destination is the peripheral device or the other node, data read from the I/O request destination are stored in a reception queue in the main memory via the I/O control circuit 11 and the memory controller MC.

FIG. 3 is a view illustrating an example of programs of the kernel in the OS that is executed by the processor according to this embodiment. The kernel is stored in the storage 20_1, expanded to the main memory when the computer is activated, and executed by the core of the processor.

The kernel includes, for example, a process scheduler 41, a process dispatcher 42, an idle process 43, an interrupt routine 44, and a polling process 45. In this embodiment, processing units executed by the respective cores of the CPU will be referred to as "processes". A "process" will also be referred to as a "task".

The process scheduler 41, being executed by the processor, schedules an execution order for various processes generated from the application program on the basis of respective priority levels (execution priority levels) thereof, for example. The process scheduler 41 then registers links (link destination information) to the processes in slots of run queues RUN_QUE_0, RUN_QU_1. The respective slots of the RUN queues are associated with execution priority levels of executable processes. When a slot corresponding to the execution priority level of a new process, for example, is not available, the process scheduler generates a new slot, associates the new process with the new slot and reshuffles the order of the slots. Further, a RUN queue is provided for each core, for example, but may be provided for each processor having a plurality of cores. The RUN queues may be stored in the main memory M_MEM.

The dispatcher 42, being executed by the processor, dispatches a process registered in the RUN queue and have the core execute the process when a predetermined condition is satisfied.

The idle process 43 is run by a core of the processor when there are no processes to be executed by that core. The idle process executes an operation in an energy saving mode or the like, for example.

The interrupt routine 44, being executed by the processor, determines the cause of an interrupt when the interrupt is generated in the processor and executes processing corresponding to the cause of the interrupt. When a processor interrupt occurs, a context in a core of the processor is switched, whereupon the interrupt routine is run by the core.

The polling process 45, being executed by the processor, periodically checks a reception queue in which data and packets from the I/O request destination are stored, detects a reception event relating to data or a packet, and either calls a function of corresponding I/O processing or executes I/O processing itself, for example. For this purpose, the polling process 45 refers to polling lists POL_LST_0 to POL_LST_2 including addresses of polling destinations in order to determine whether or not a reception event has occurred at a polling destination. The polling lists may be stored in the main memory M_MEM during initial setting, for example.

When peripheral devices are connected to the peripheral device interface 14 of the computer, device drivers DDR_0 to DDR_2 that is programs for controlling the peripheral devices are added to the kernel. The device drivers control the peripheral devices in response to I/O requests addressed thereto. Data or packets received from the peripheral devices are stored in reception queues RCV_QUE_0 to RCV_QUE_2 corresponding to the I/O requests respectively. The reception queues RCV_QUE_0 to RCV_QUE_2 may be stored in the main memory M_MEM.

Task structures and so on of processes PR # are stored in the main memory M_MEM in addition to the elements described above.

When the polling process 45 sets the reception queues RCV_QUE_0 to RCV_QUE_2 managed by the device drivers as the polling destination, the polling lists POL_LST_0 to POL_LST_2 of the polling process include the respective addresses of the reception queues.

Japanese Patent Application No. 2017-136514

In Japanese Patent Application No. 2017-136514, mentioned above, high-speed I/O processing is performed by including a polling task in an idle routine (or an idle process) having the lowest priority level and running the polling task when there are few tasks having a high priority level such that the processor runs the idle routine. The idle routine is included in the kernel and is normally not allocated to a RUN queue. When there are no tasks to be executed, a scheduler selects the idle routine as a running subject, and a processor not having any tasks to execute runs the idle routine.

However, when there are a plurality of other tasks having a higher priority level than the idle routine and all of the plurality of processors are currently executing these other tasks, the idle routine is not run. In this case, a polling process is not executed, and as a result, the performance of the I/O processing deteriorates.

First Embodiment

Figure 4B:
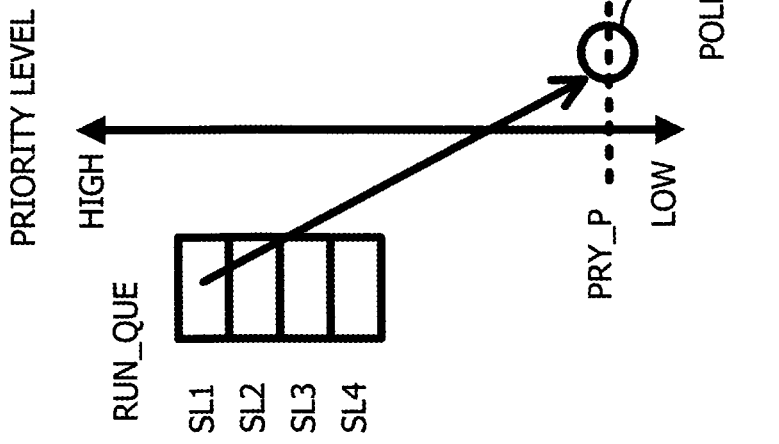
FIGS. 4A and 4B are views illustrating a relationship between normal processes and a polling process according to a first embodiment.
Figure 4A:
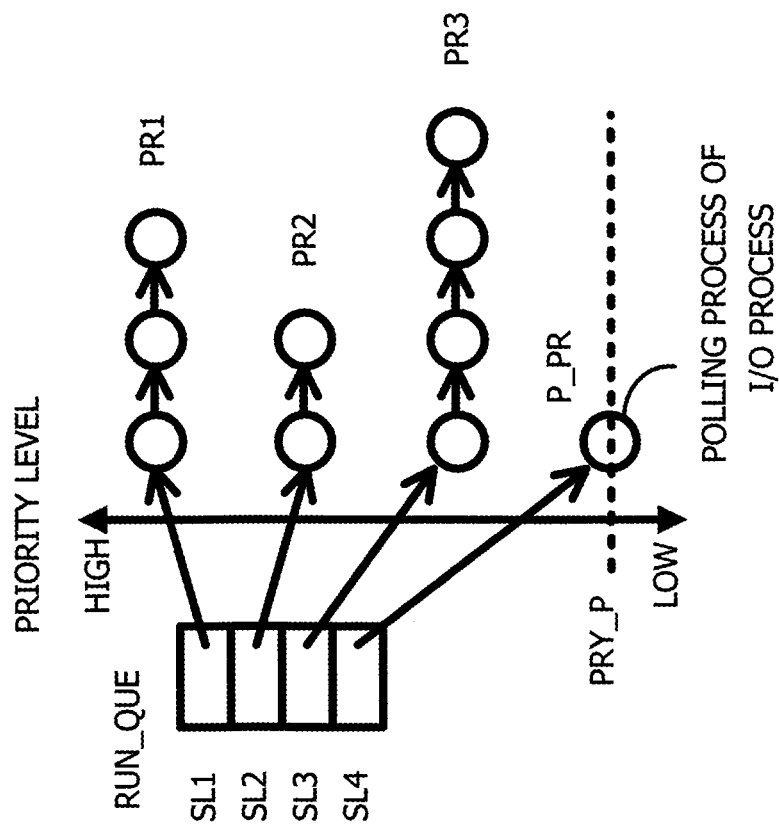

FIGS. 4A and 4B are views illustrating a relationship between normal processes and a polling process according to a first embodiment. In this embodiment, the process scheduler schedules the execution order of a polling process included in I/O processing as well as normal processes. In other words, the process scheduler registers the processes in the RUN queue on the basis of the execution priority levels of the processes. The core of the processor then executes the scheduled normal process or polling process registered in the RUN queue.

FIGS. 4A and 4B depict normal processes PR1, PR2, PR3 and a polling process P_PR linked respectively to slots SL1 to SL4 of a RUN queue RUN_QUE. A vertical axis indicates the execution priority levels of the processes, which increase steadily upward. Three processes PR1 are linked in order by links to the RUN queue slot SL1 having the highest execution priority level. In the figure, circles represent task structures of the processes and arrows represent links. Similarly, two processes PR2 are linked in order by links to the slot SL2 having the next highest execution priority level, and four processes PR3 are linked in order by links to the next slot SL3. In the first embodiment, a execution priority level PRY_P lower than that of the normal processes is set in relation to the polling process P_PR. Accordingly, the polling process P_PR is linked to the slot SL4 having the lowest execution priority level. As will be described below, however, a higher execution priority level may be set to the polling process P_PR.

The dispatcher then causes the core of the processor CPU to execute the processes having the highest execution priority level, among the processes registered in the RUN queue, in link order, for example.

Hence, when the processes PR1, PR2, PR3 having higher execution priority levels than the execution priority level PRY_P of the polling process P_PR are registered in the RUN queue, as illustrated in FIG. 4A, the core of the processor does not execute the polling process P_PR. In other words, in FIG. 4A, the core is in a high load state, and therefore the core executes the processes PR1 to PR3 other than the polling process P_PR. In this case, an I/O driver provided in the device driver issues an I/O request with a CPU interrupt to the I/O request destination. Accordingly, the core of the processor is notified that data have been received in response to the I/O request by the CPU interrupt, and executes I/O processing by means of the CPU interrupt.

When, on the other hand, there are no processes having a higher execution priority level than the execution priority level PRY_P of the polling process P_PR, as illustrated in FIG. 4B, the polling process P_PR is registered in the slot SL1 of the RUN queue. Accordingly, the core of the processor executes the polling process in the slot SL1. In other words, in FIG. 4B, the core is in a low load state in which there is no need to execute normal processes other than the polling process, and therefore the polling process having the execution priority level PRY_P is executed thereby. In this case, the I/O driver provided in the device driver issues an I/O request with the polling process to the I/O request destination. Accordingly, the core of the processor executes the polling process in order to detect the reception of data in response to the I/O request. In this case, when data reception is detected by the polling process, no CPU interrupts are generated, and instead, for example, the polling process either calls a function for executing the I/O processing or executes the I/O processing itself. Since no CPU interrupts are generated, the I/O processing is executed at high speed.

Figure 5:
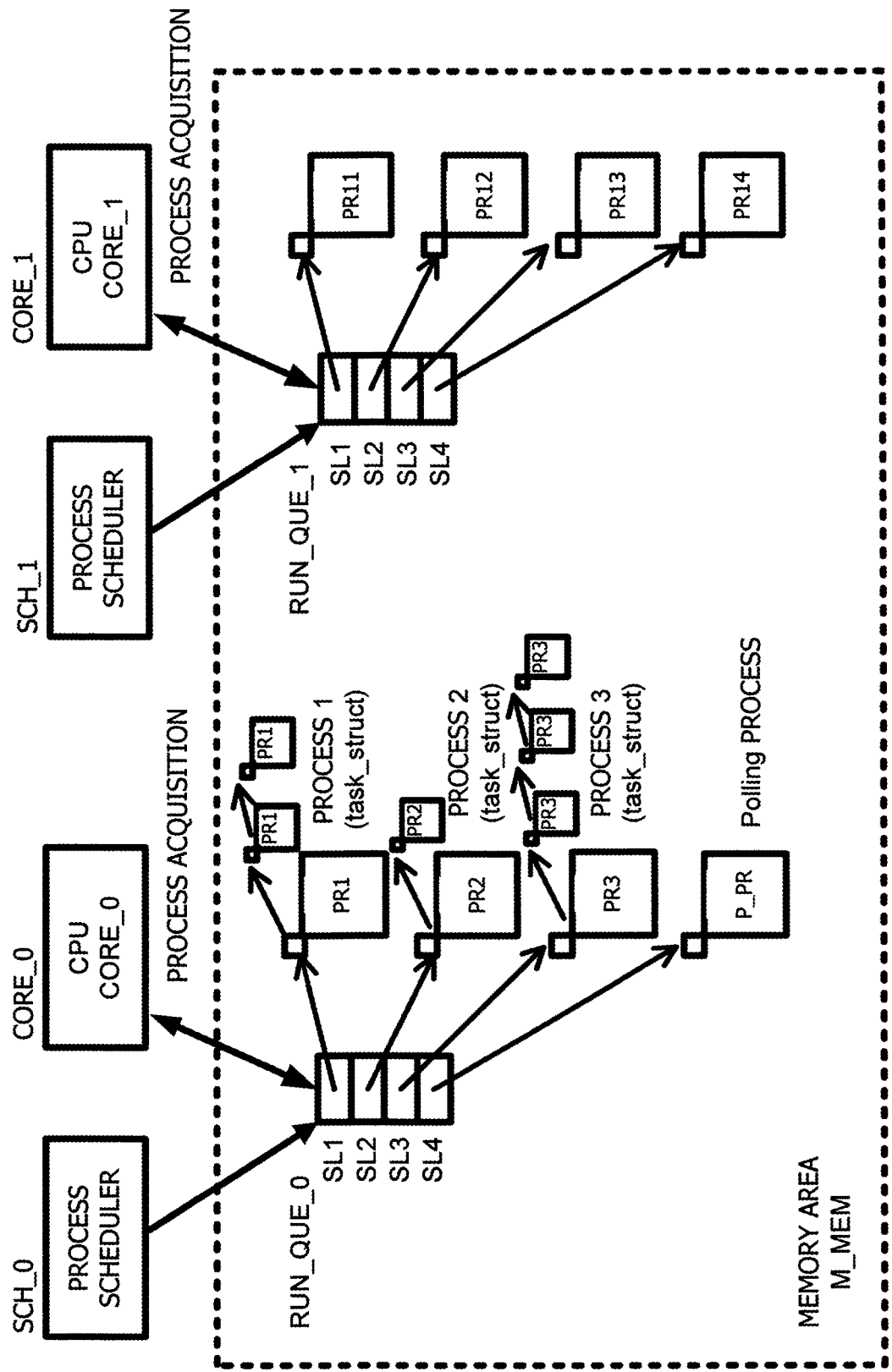
FIG. 5 is a view illustrating a relationship between normal processes and a polling process when the processor includes two cores.

FIG. 5 is a view illustrating a relationship between normal processes and a polling process when the processor includes two cores. The two cores CORE_0, CORE_1 respectively run schedulers SCH_0, SCH_1 in order to schedule processes PR # (#=1-3 and 11-14) and a polling process P_PR to be registered in respective RUN queues RUN_QUE_0, RUN_QUE_1 of the two cores. As illustrated in FIG. 3, the RUN queues RUN_QUE_0, RUN_QUE_1, the processes PR #, and the polling process P_PR are stored in the memory area. Further, in case of processes and a polling process, task structures each having process IDs and memories that are used by the processes and so on are stored in the memory area.

The RUN queue RUN_QUE_0 of the core CORE_0 is in an identical state to that of FIG. 4A. In other words, the scheduler SCH_0 registers three processes PR1 in the slot SL1 of the RUN queue RUN_QUE_0 having the highest execution priority level using links, and similarly registers two processes PR2 in the slot SL2, four processes PR3 in the slot SL3, and the polling process P_PR in the slot SL4 having the lowest execution priority level respectively using links. The reason why the polling process is registered in a slot having a lower priority level than those of the other processes is that the polling process is set to have the lowest priority level.

Similarly, the scheduler SCH_1 of the core CORE_1 registers the processes PR11 to PR 14 in the respective slots SL1 to SL4 of the RUN queue RUN_QUE_1 using links.

The schedulers register the processes to be executed in the slots of the RUN queues corresponding to the execution priority levels thereof on the basis of the execution priority levels. Control for registering a process in which core's RUN queue is executed by another process on the basis of a rule for maintaining balance between the loads of the RUN queues or the like, for example.

Then, when conditions for executing a new process are met, for example when a process currently being executed by a core is completed or a predetermined time elapses, a dispatcher, not depicted in the figures, dispatches the processes in the RUN queue that have the highest execution priority level in order to the core. In response, the core executes the dispatched processes.

In the example depicted in FIG. 5, as is evident from the process scheduling performed by the scheduler and selection of the process to be dispatched by the dispatcher, described above, when the polling process is registered in the uppermost slot of either of the two RUN queues, one of the cores executes the polling process.

Figure 6:
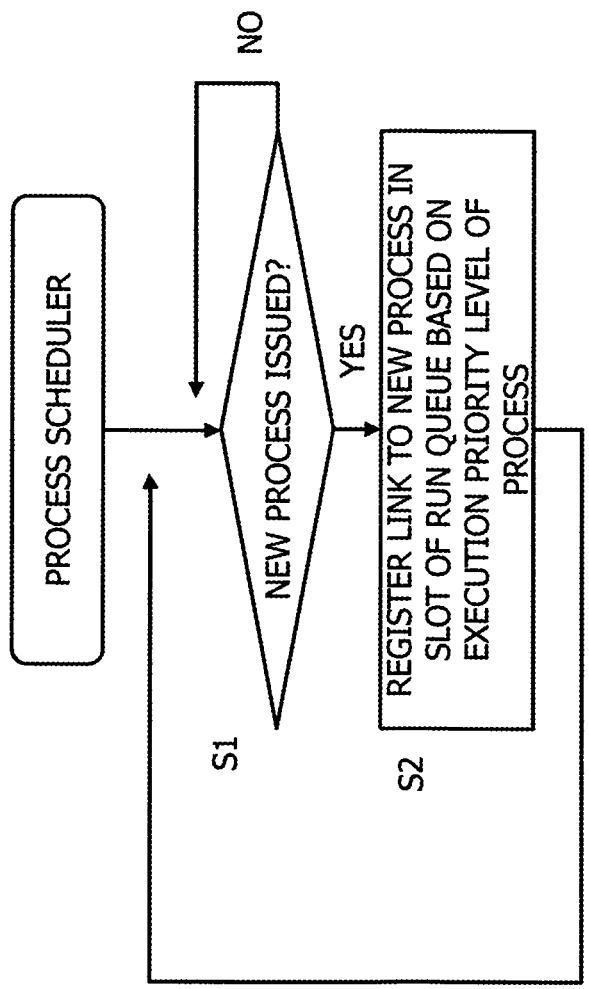
FIG. 6 is a view illustrating a flowchart of processing executed by a process scheduler.

FIG. 6 is a view illustrating a flowchart of processing executed by a process scheduler. The process scheduler, being run by each core, when a new process is generated by the application program (YES in S1), for example, registers the process (a link to the process is generated) in the slot of the corresponding RUN queue that corresponds to the execution priority level of the process on the basis of the execution priority level of the process (S2). The plurality of slots in the RUN queue is arranged in order of the execution priority level. When a slot corresponding to the execution priority level of the new process is not available in the RUN queue, the process scheduler inserts a new slot between existing slots and registers the new process in the new slot. As a result, the registered processes linked to the existing slots are rescheduled.

As described above, the process scheduler registers a process to be executed in a slot of the RUN queue on the basis of the execution priority level of the process, and therefore the dispatcher may simply select the processes in the RUN queue slot having the highest priority level in order and dispatch the selected processes to the core. As a result, the core of the processor executes the processes to be executed in descending order of the execution priority levels thereof.

Figure 7:
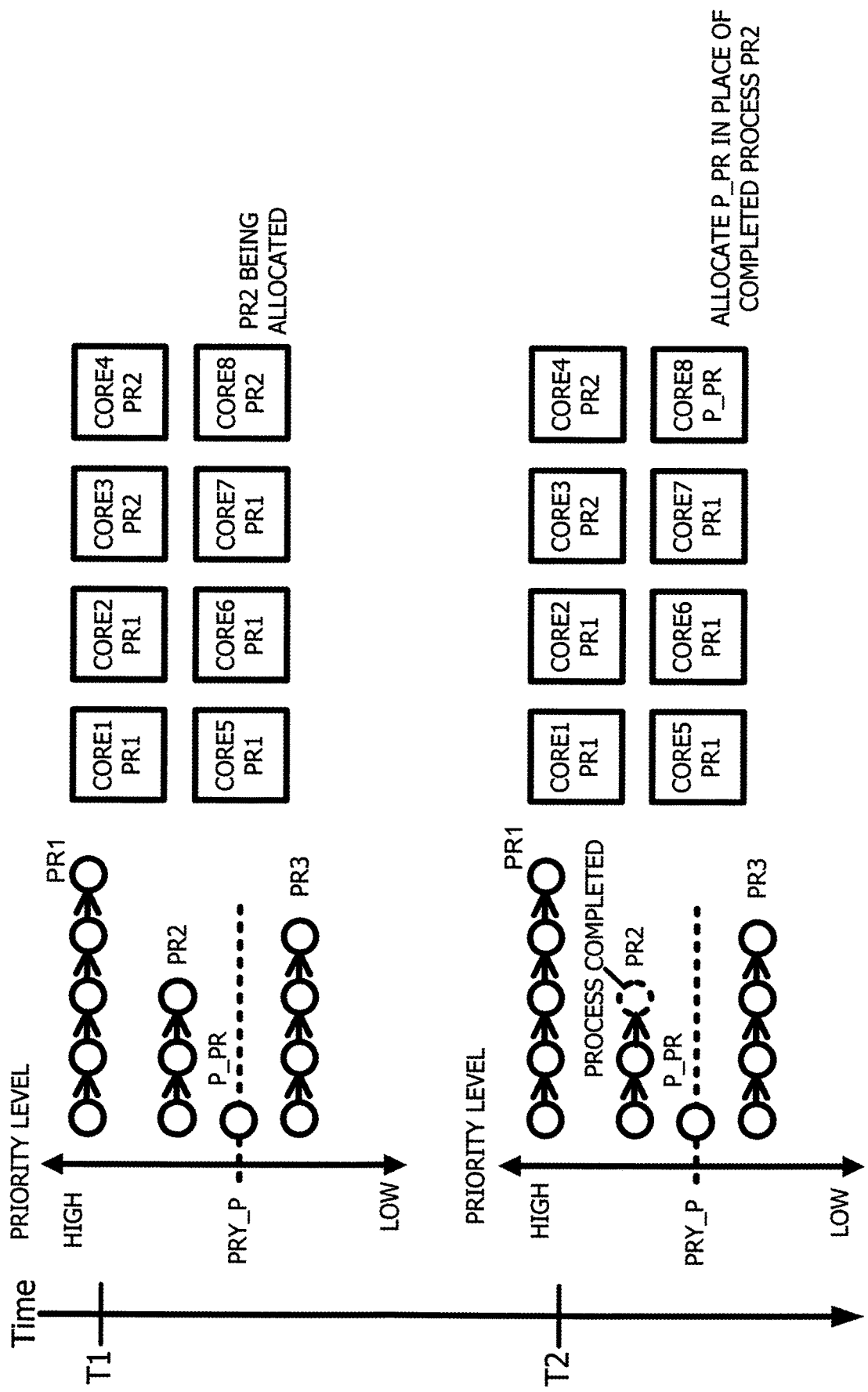
FIG. 7 is views illustrating examples of control of the process scheduler and the dispatcher.
Figure 8:
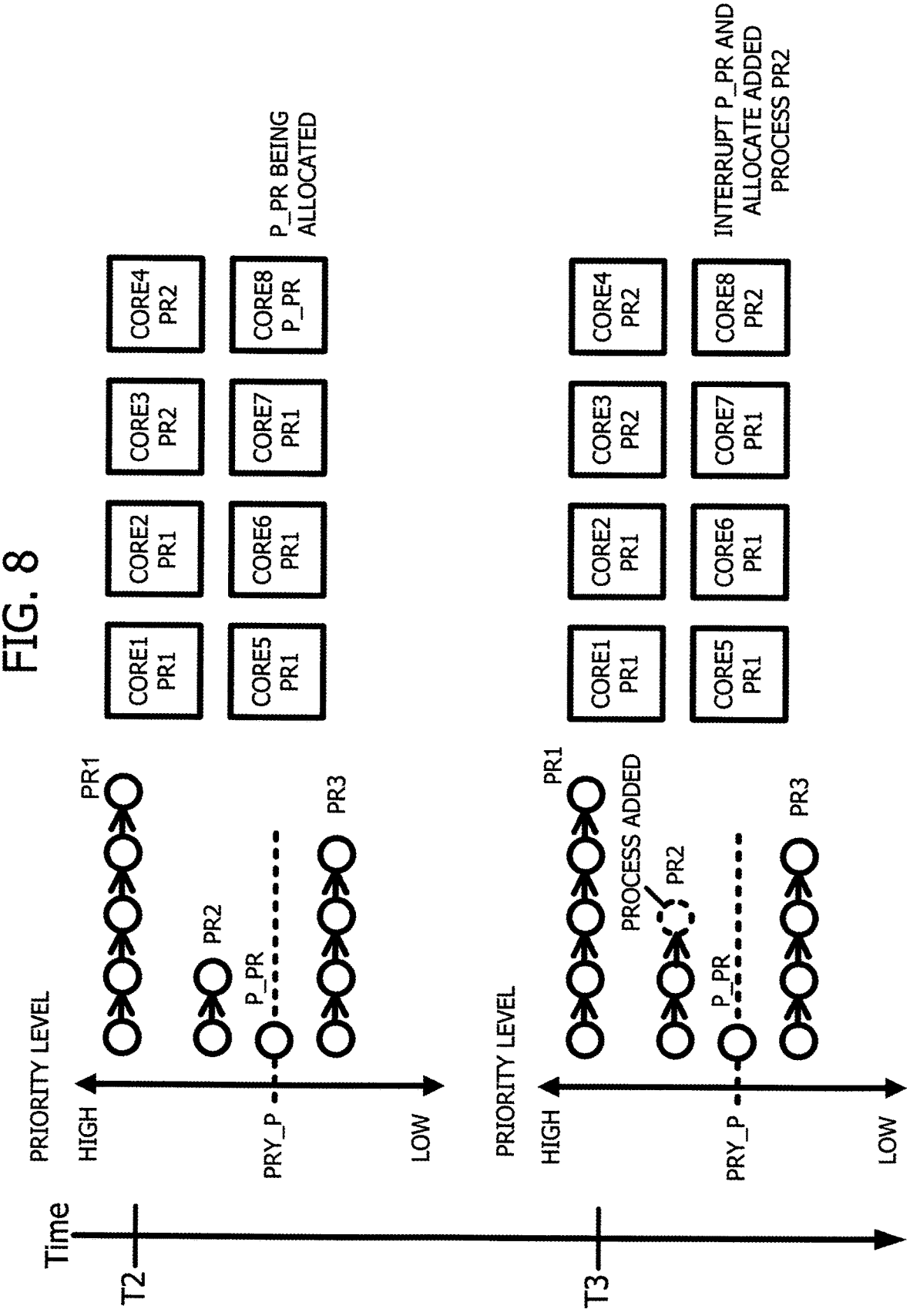
FIG. 8 is views illustrating examples of control of the process scheduler and the dispatcher.

FIGS. 7 and 8 are views illustrating examples of control of the process scheduler and the dispatcher. Here, eight cores, for example, are used to execute processes. The RUN queues of the respective cores have been omitted from the figures, and instead all of the processes registered in the respective RUN queues of the eight cores are arranged along the priority level axis. Similarly to FIGS. 4A and 4B, circles represent the task structures of the processes and arrows represent links. Further, a temporal axis Time is depicted in a vertical direction, and states of the processes at each of times T1 to T3 are depicted in accordance with the priority level axis.

At the time T1 in FIG. 7, the polling process P_PR, processes PR1 and PR2 having a higher priority level than the execution priority level PRY_P of the polling process, and a process PR3 having a lower priority level are registered in the RUN queue. There are five processes PR1 having the highest priority level, three processes PR2, four processes PR3, and one polling process P_PR.

In this case, the process scheduler registers the five processes PR1 having the highest priority level in the respective RUN queues of five cores CORE1, CORE2, CORE5, CORE6, and CORE7, for example, whereupon the dispatcher dispatches the five processes PR1 to the respective cores to be executed thereby. Further, the three processes PR2 having the next highest priority level are registered in the respective RUN queues of the three cores CORE3, CORE4, and CORE8 and executed thereby. As a result, the polling process P_PR having the execution priority level PRY_P is not executed by any of the cores.

At the time T2 in FIG. 7, the core CORE8 finishes executing the process PR2. As a result, the polling process P_PR is registered in the RUN queue of the core CORE8 at the highest priority level so that the core CORE8 executes a process switch from the process PR2 to the polling process P_PR. Following the time T2, the core CORE8 continues to execute the polling process P_PR.

The time T2 in FIG. 8 is identical to the time T2 in FIG. 7. Subsequently, at a time T3 in FIG. 8, the process PR2, which has a higher priority level than the execution priority level PRY_P of the polling process P_PR, is added. Accordingly, the process scheduler reschedules the processes in the RUN queue of the core CORE8 so that the newly generated process PR2 is registered in a slot having a higher priority level than that of the polling process P_PR. As a result, the dispatcher interrupts execution of the polling process P_PR by the core CORE8 and dispatches the added process PR2 to the core CORE8 to be executed thereby. Following the time T3, execution of the polling process remains in an interrupted state.

Hence, when the number of processes having a higher execution priority level than the execution priority level PRY_P of the polling process P_PR reaches or exceeds the number of cores, the polling process P_PR is not executed. This state corresponds to a high load state in the core group due to execution of the normal processes PR1 and PR2. When the number of processes having a higher execution priority level than the execution priority level PRY_P of the polling process P_PR falls below the number of cores, on the other hand, the polling process P_PR is executed. This state corresponds to a low load state in which the core group can execute the polling process.

Therefore, when the execution priority level PRY_P of the polling process is set at a predetermined priority level, the frequency or probability with which the cores execute the polling process can be modified in accordance with the execution priority level PRY_P thereof.

Hybrid I/O Processing Including Both Polling Process and CPU Interrupt

Next, hybrid I/O processing according to this embodiment including both the polling process and a CPU interrupt will be described. The processing of the I/O driver in the device driver and the processing of the polling process will be described first, followed by a description of I/O processing by the polling process and I/O processing by a CPU interrupt.

In this embodiment, in accordance with the scheduling performed by the process scheduler, the core executes the polling process depend on the load thereof. Switch control for switching between the polling process and a CPU interrupt as means for completion check in the I/O processing is then performed in accordance with whether or not the polling process is currently underway in a core.

In other words, in a high load state in which there are many processes having a higher execution priority level than the polling process, execution of the processes having a higher execution priority level is prioritized over the polling process, and the I/O processing is executed by means of a CPU interrupt. In this case, the I/O processing is performed at low speed due to the CPU interrupt. In a low load state in which there are few or no processes having a higher execution priority level than the polling process, on the other hand, the polling process is executed by a core such that the I/O processing is executed by means of the polling process. In this case, the I/O processing is performed at high speed due to the polling process.

Figure 9:
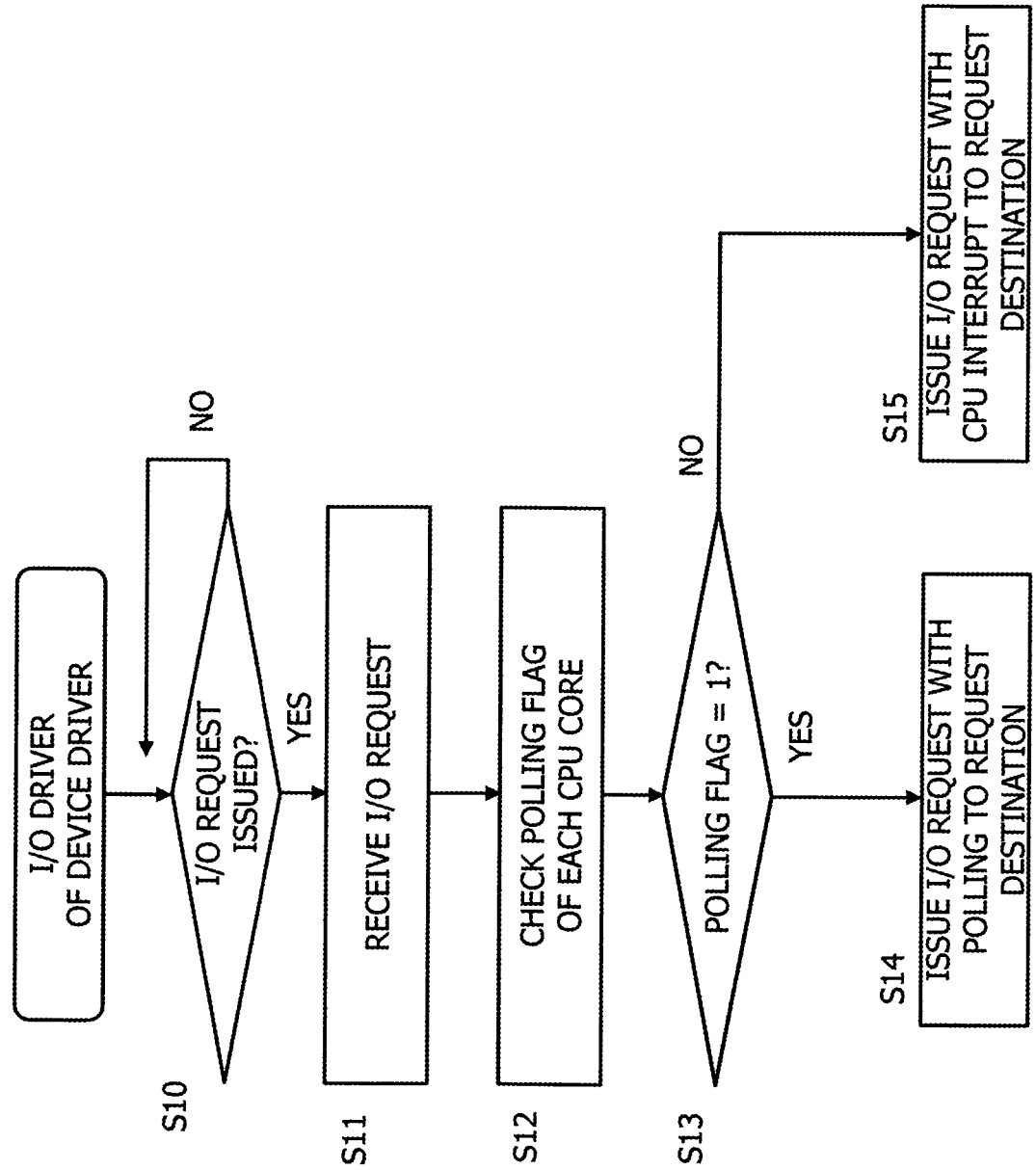
FIG. 9 is a view illustrating a flowchart of processing executed by the I/O driver in the device driver.

FIG. 9 is a view illustrating a flowchart of processing executed by the I/O driver in the device driver. As illustrated in FIG. 3, the device drivers are installed in the kernel in accordance with the peripheral devices. When the core issues an I/O request to a peripheral device or the like, the device driver of the I/O request destination is run by the core.

As illustrated in FIG. 9, the I/O driver of the device driver is run by the core. When an I/O request is issued (YES in S10), the I/O driver receives the I/O request from the core (S11). The I/O driver then checks a polling flag indicating whether or not the polling process is underway in each of the cores (S12). The polling process includes processing for setting the polling flag at "1" at the start of execution thereof by the core, for example.

When the polling flag is at "1" (YES in S13), or in other words when the polling process is currently underway in the core, the I/O driver issues an I/O request with the polling process to the request destination in response to reception of the I/O request (S14). When the polling flag is at "0" (NO in S13), or in other words when the polling process is not currently underway in the core, the I/O driver issues an I/O request with a CPU interrupt to the request destination in response to reception of the I/O request (S15). When an I/O request with the polling process is issued, reception of data or a packet in response to the I/O request is checked by the polling process. When an I/O request with a CPU interrupt is issued, on the other hand, reception is checked by a CPU interrupt. This processing will be described in detail below.

Figure 10:
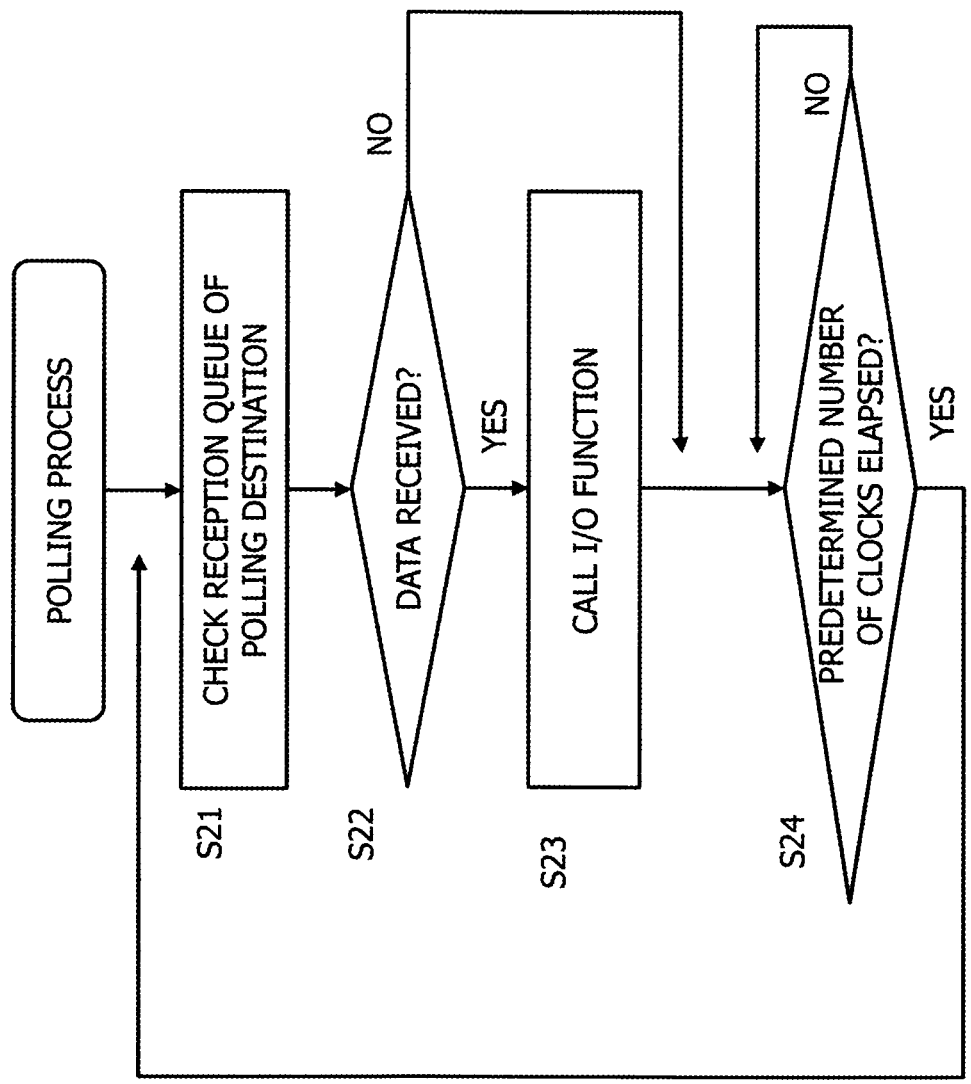
FIG. 10 is a view illustrating a flowchart of processing executed during the polling process.

FIG. 10 is a view illustrating a flowchart of processing executed during the polling process. The polling process, being executed by the core of the processor, checks whether or not data have been received in the reception queue of the polling destination (S21) and call an I/O function for executing I/O processing corresponding to the reception queue (S23) when data have been received (YES in S22). In the polling process, the processing of S21 to S23 is repeated every time a predetermined number of clocks elapses, for example (YES in S24).

The polling process may be set to check for data reception in the reception queues of a plurality of peripheral devices or to check for data reception in the reception queue of a single peripheral device. Further, when data reception is detected (YES in S22), the polling process may either call an I/O function for executing I/O processing corresponding to the I/O request (S23) or execute the I/O processing itself.

I/O Processing by Polling Process

Figure 11:
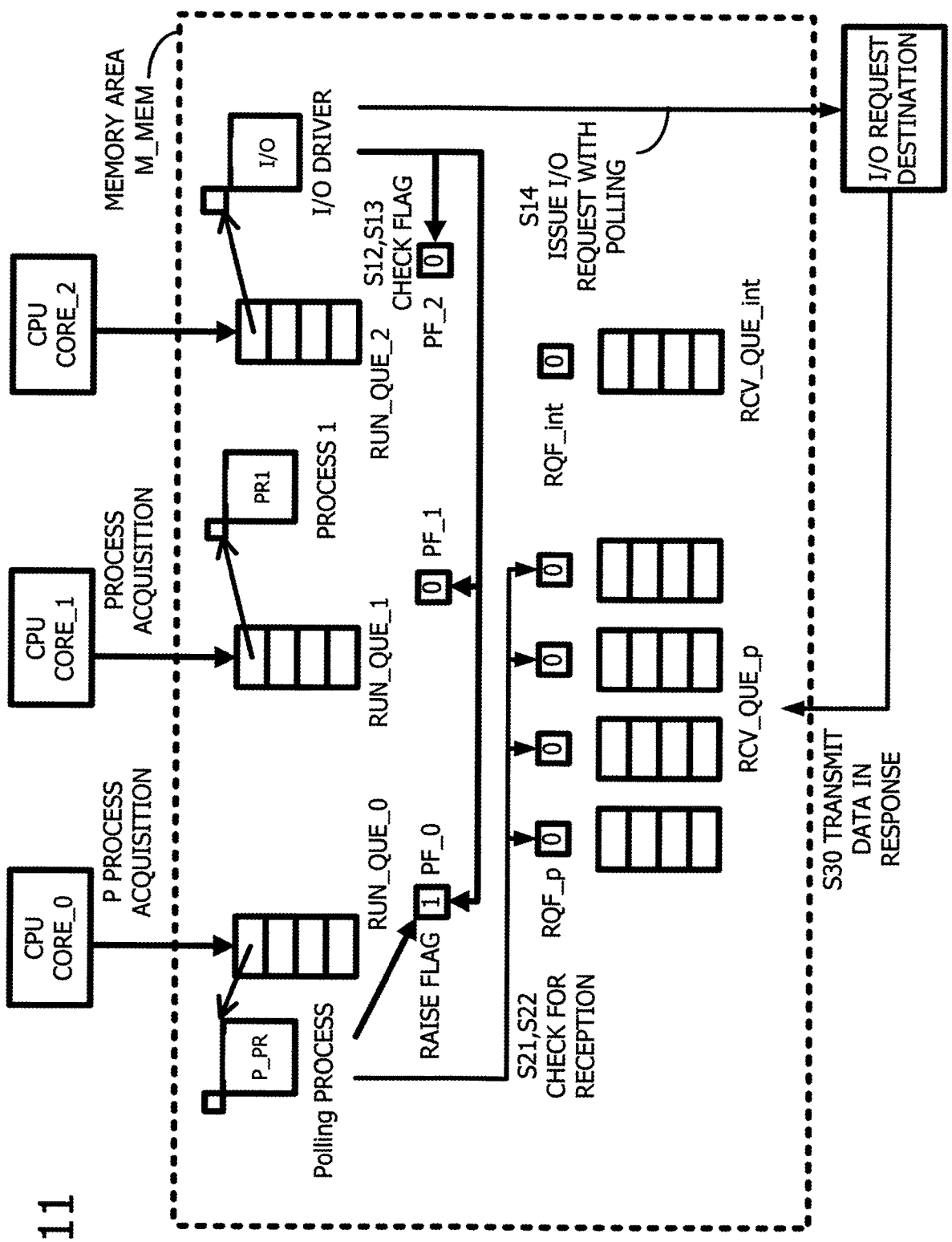
FIG. 11 is a view illustrating an example in which I/O processing is performed by means of the polling process.
Figure 12:
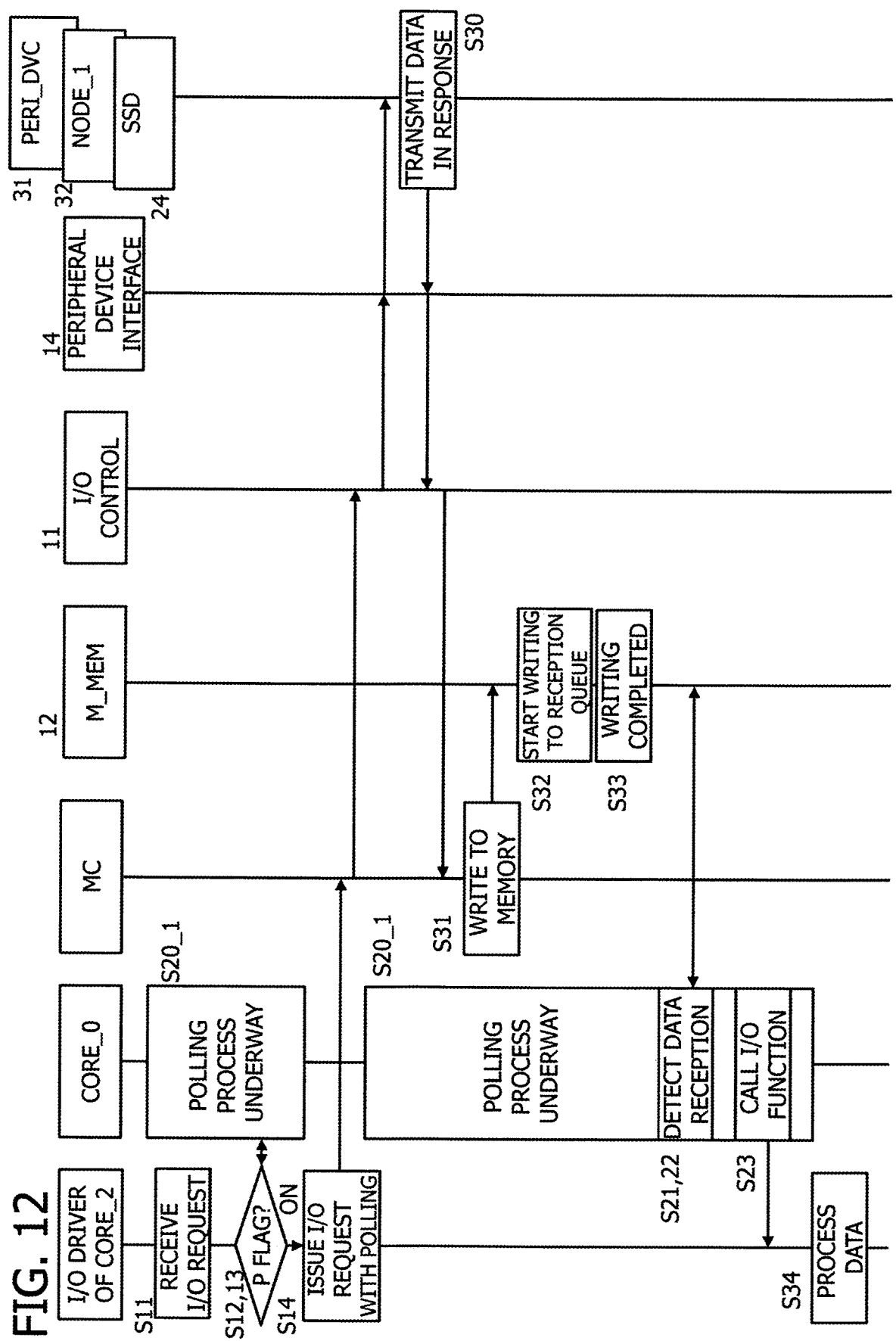
FIG. 12 is a view illustrating a sequence flowchart from the I/O request to the I/O processing in a case where the I/O processing is performed by means of the polling process.

FIG. 11 is a view illustrating an example of I/O processing performed by means of the polling process. FIG. 12 is a view illustrating a sequence flowchart from the I/O request to the I/O processing in a case where the I/O processing is performed by means of the polling process. FIG. 11 depicts an example in which the processor has three cores and respective RUN queues RUN_QUE_0 to RUN_QUE_2 are provided in the memory area M_MEM in relation to the cores CORE_0 to CORE_2. Further, polling flags PF_0 to PF_2 indicating that the polling process is currently underway in the corresponding core are provided in the memory area in accordance with the RUN queues of the respective cores. For example, the polling flag PF is set at "1" when the core starts to execute the polling process and reset to "0" when the polling process is interrupted.

Further, a reception queue RCV_QUE_p relating to the I/O request with the polling process, a reception queue RCV_QUE_int relating to the I/O request with a CPU interrupt, and reception queue flags RQF_p, RQF_int provided respectively for these reception queues are stored in the memory area. The reception queues RCV_QUE_p are provided for four peripheral devices respectively, for example. The reception queue RCV_QUE_int is provided singly, but may be provided in a plurality in accordance with the peripheral devices. The reception queue flags RQF_p, RQF_int are set at "1" when data are received in the corresponding reception queue and returned to "0" when the received data are processed, for example.

Referring to FIGS. 11 and 12, an example of processing performed when the I/O processing is executed by means of the polling process will be described. As illustrated in FIG. 11, it is assumed that the polling process is currently underway in the core CORE_0 and that the core CORE_2 is currently executing the I/O driver of the device driver relating to the peripheral device that is the I/O request destination.

The core CORE_2 runs the I/O driver to receive an I/O request from one of the cores (S11) and check the polling flags PF_0 to PF_2 to determine whether or not the polling process is currently underway in one of the cores (S12). When it is determined by this determination that the polling process is underway in the core CORE_0 (YES in S13), the I/O driver issues an I/O request with the polling process to the request destination (S14). At this time, the polling process is underway in the core CORE_0 (S20_1).

The I/O driver may include in the I/O request with the polling process, in addition to the ID of the I/O request, a flag indicating that the I/O request relates to the polling process, an ID of the reception queue in which response data are to be received, and so on. Alternatively, the ID of the I/O request, the aforesaid flag, and the reception queue ID may be stored in an I/O request buffer for storing information relating to an issued I/O request. Using one of these methods, the fact that the I/O request is an I/O request with the poling process and the reception queue for receiving the data are recorded.

The issued I/O request generates a cache miss in the cache memory, for example, and is therefore transmitted to the peripheral device (or other node) 24, 32, 31 that is the request destination via the memory controller MC, the I/O control circuit 11, and the peripheral device interface 14. In response to the I/O request, the peripheral device or other node that is the request destination transmits data (S30).

The transmitted data are input back into the memory controller MC via the peripheral device interface 14 and the I/O control circuit 11. The memory controller MC then writes the received data in the reception queue of the I/O request with the polling process within the memory (S31, S32). The received data may be written by, for example, having the memory controller MC execute direct memory access processing in order to write the received data in the reception queue within the main memory.

Meanwhile, the polling process is underway in the core CORE_0 (S20_1), and therefore the core CORE_0 periodically checks the reception queue flag RQF of the reception queue. Hence, when writing of the received data to the reception queue in the main memory is complete such that the reception queue flag RQF switches to "1" (S33), the polling process executed by the core CORE_0 detects that the reception queue flag RQF is at "1" (S21, S22) and calls an I/O function corresponding to the I/O request (S23). In response to execution of the I/O function, the core CORE_0 that is the I/O request source executes predetermined processing on the received data in the reception queue (S34).

In the above example of I/O request processing, it is the low load state, in which there are few processes having a higher execution priority level than the execution priority level of the polling process, which means that the polling process is underway in one of the cores. Hence, when the core executing the polling process detects the completion of the data reception in response to the I/O request, the core can start predetermined I/O processing without the delay when a process switch in the core by means of a CPU interrupt is occurred, and as a result, the I/O processing is executed at high speed.

I/O Processing by CPU Interrupt

Figure 13:
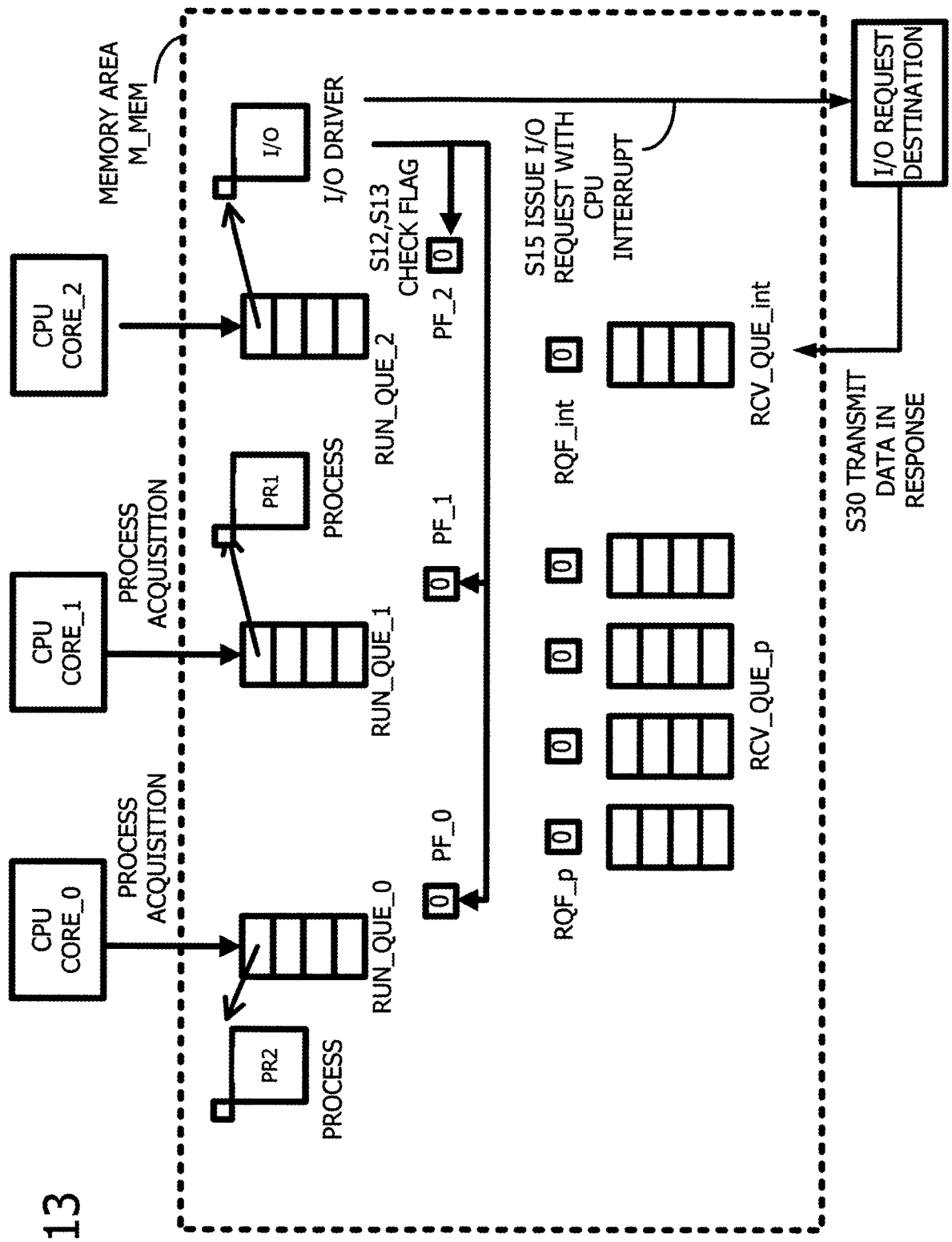
FIG. 13 is a view illustrating an example in which I/O processing is performed by means of a CPU interrupt.
Figure 14:
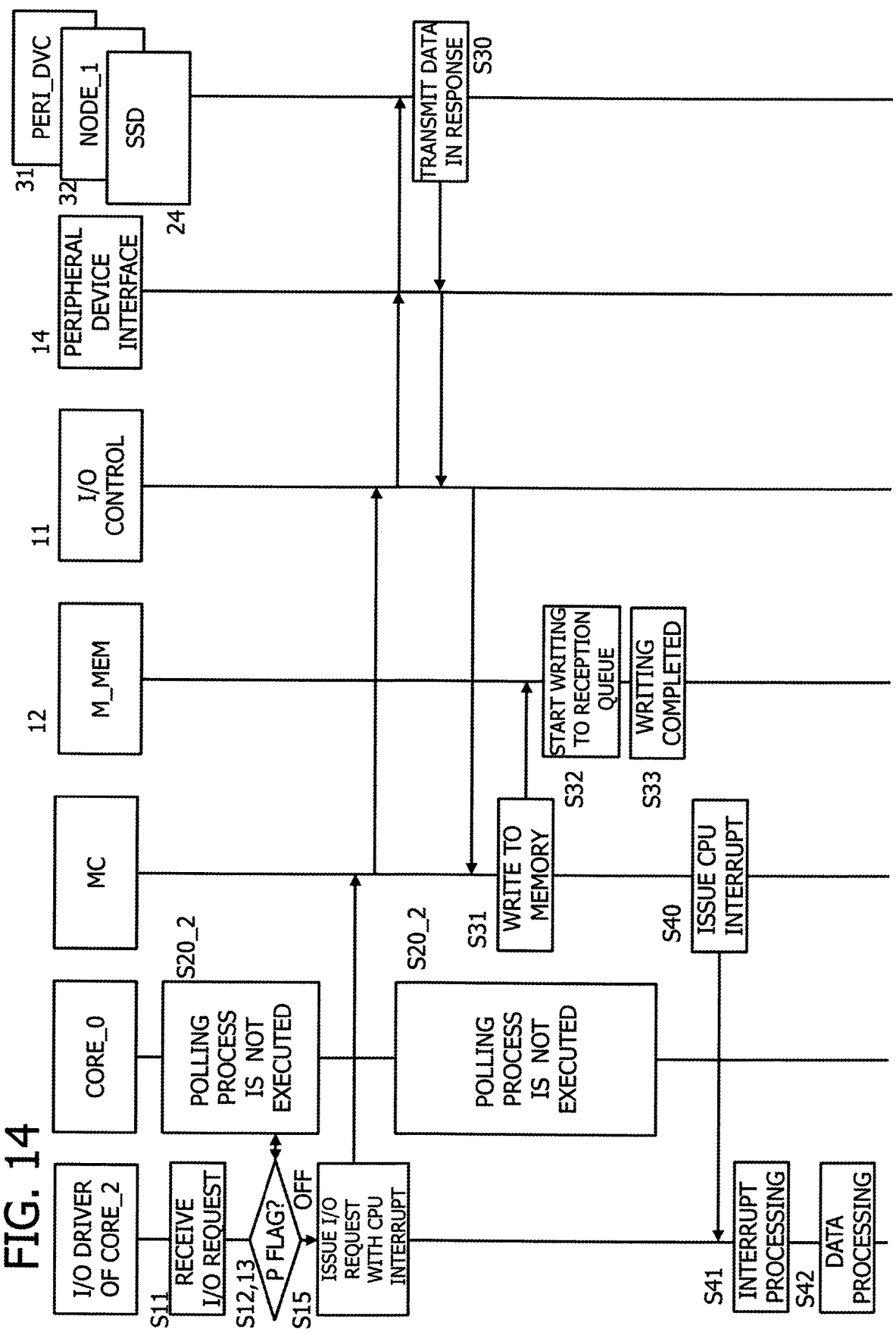
FIG. 14 is a view illustrating a sequence flowchart from the I/O request to the I/O processing in a case where the I/O processing is performed by means of a CPU interrupt.

FIG. 13 is a view illustrating an example in which I/O processing is performed by means of a CPU interrupt. FIG. 14 is a view illustrating a sequence flowchart from the I/O request to the I/O processing in a case where the I/O processing is performed by means of a CPU interrupt. FIG. 13 illustrates similar configuration to FIG. 11, and FIG. 14 illustrates a process in the identical configuration to FIG. 12.

Referring to FIGS. 13 and 14, an example of processing performed when the I/O processing is executed by means of a CPU interrupt will be described. As illustrated in FIG. 13, it is assumed that the polling process is not currently underway in any of the cores CORE_0 to CORE_2 and the core CORE_2 is currently running the I/O driver of the device driver corresponding to the peripheral device that is the I/O request destination.

The core CORE_2 runs the I/O driver, and the I/O driver receives an I/O request from one of the cores (S11) and checks the polling flags PL0 to PF_2 to determine whether or not the polling process is currently underway in one of the cores (S12). When it is determined by this determination that the polling process is not underway (NO in S13), the I/O driver issues an I/O request with a CPU interrupt to the request destination (S15).

The I/O driver may include in the I/O request with a CPU interrupt, in addition to the ID of the I/O request, a flag indicating that the I/O request relates to a CPU interrupt, an ID of the reception queue in which response data are to be received, and so on. Alternatively, the ID of the I/O request, the aforesaid flag, and the reception queue ID may be stored in an I/O request buffer for storing information relating to an issued I/O request. Using one of these methods, the fact that the I/O request is an I/O request with a CPU interrupt and the reception queue for receiving the data are recorded.

The issued I/O request generates a cache miss in the cache memory, for example, and is therefore transmitted to the peripheral device (or other node) 24, 32, 31 that is the request destination via the memory controller MC, the I/O control circuit 11, and the peripheral device interface 14. In response to the I/O request, the peripheral device or other node that is the request destination transmits data (S30).

The transmitted data are input back into the memory controller MC via the peripheral device interface 14 and the I/O control circuit 11. The memory controller MC then writes the received data in the reception queue corresponding to the CPU interrupt within the memory (S31, S32). Similarly to FIG. 12, the received data may be written by, for example, having the memory controller MC implement direct memory access.

When writing of the received data to the reception queue in the main memory is complete, the memory controller MC issues a CPU interrupt (S40). The CPU interrupt is issued to the core CORE_2 that is the I/O request source. The core CORE_2 detects that the cause of the CPU interrupt is the completion of data reception in response to the I/O request, and executes CPU interrupt processing (S41). The core CORE_2 that is the I/O request source then executes processing on the received data in the reception queue (S42).

In the above example of I/O request processing, it is the high load state, in which there are many processes having a higher execution priority level than the execution priority level of the polling process, which means that the polling process is not underway in any of the cores. Hence, the core does not have to have the load for executing the polling process, the cores only execute processes having a high execution priority level. Meanwhile, when data reception in response to the I/O request is complete, a CPU interrupt is issued, and therefore the core that is the I/O request source can execute I/O processing in accordance with the I/O request then. Note, however, that in this case, the core CORE_2 executes a process switch for switching to CPU interrupt processing, and therefore the I/O processing is performed at low speed.

Second Embodiment

In the first embodiment, the execution priority level of the polling process is set to be lower than the execution priority levels of the other processes. However, the execution priority level of the polling process may be set to be higher than the execution priority levels of some of the other processes. Alternatively, the execution priority level of the polling process may be set at the highest execution priority level of all of the other processes or to be higher than the execution priority levels of all of the other processes.

Figure 15B:
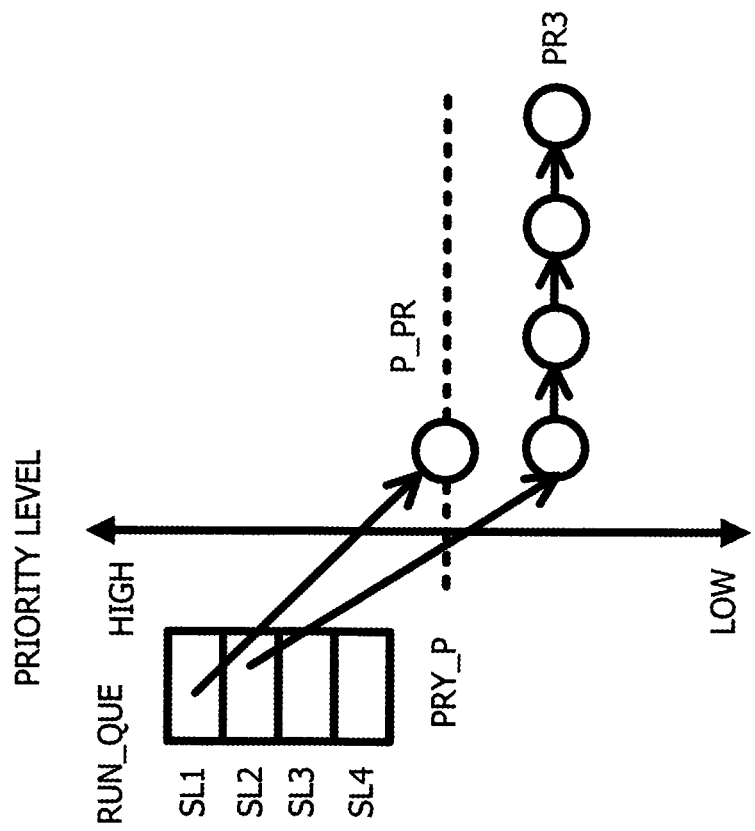
FIGS. 15A and 15B are views illustrating a relationship between normal processes and the polling process according to the second embodiment.
Figure 15A:
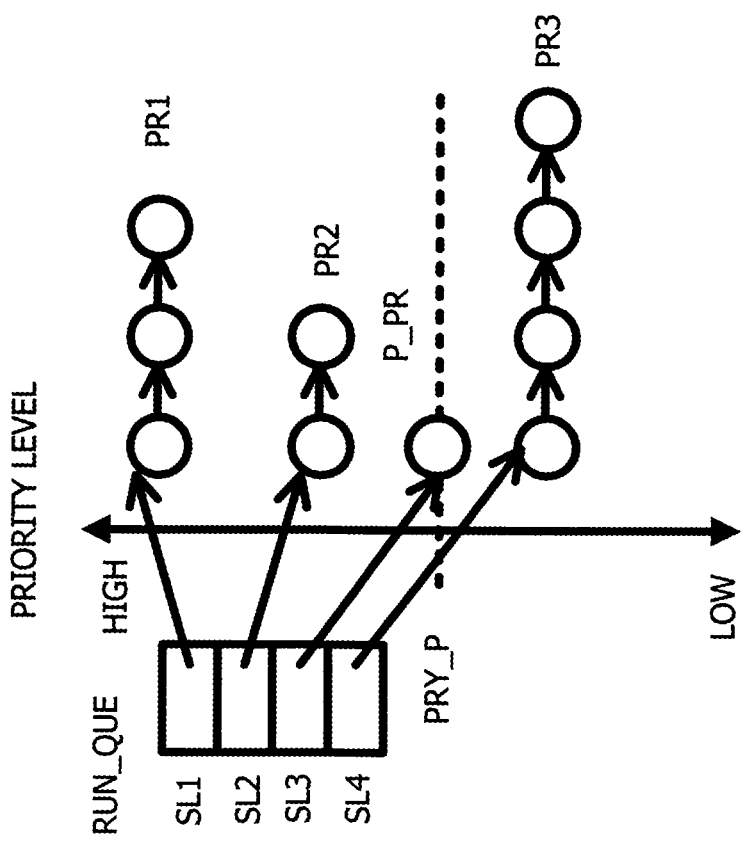

FIGS. 15A and 15B are views illustrating a relationship between normal processes and the polling process according to the second embodiment. In FIGS. 15A and 15B, similarly to FIGS. 4A and 4B, processes PR1, PR2, the polling process P_PR, and processes PR3 are registered in the RUN queue RUN_QUE corresponding to a certain single core in the slots SL1 to SL3 having respective priority levels. In the second embodiment, as illustrated in FIG. 15A, the execution priority level PRY_P of the polling process P_PR is set to be lower than that of the process PR2 but higher than that of the process PR3.

Hence, in the condition depicted in FIG. 15A, the single core executes the process PR1 having the highest execution priority level such that the polling process P_PR is not executed. In a condition depicted in FIG. 15B, however, no processes having a higher execution priority level than the execution priority level PRY_P of the polling process P_PR are registered in the RUN queue, and therefore the single core executes the polling process P_PR, which has the highest execution priority level, even when the process PR3, which has a lower execution priority level than the execution priority level PRY_P, is registered. As a result, the frequency or probability with which the core executes the polling process is higher than that of the case depicted in FIGS. 4A and 4B, in which the polling process is set at the lowest execution priority level.

Likewise in the second embodiment, the I/O driver issues an I/O request with the polling process to the request destination when the polling process is underway and issues an I/O request with a CPU interrupt to the request destination when the polling process is not underway.

According to the second embodiment, by setting the execution priority level PRY_P of the polling process according to a request of how first the I/O processing is, the speed of the I/O processing can be controlled to the desired speed.

Third Embodiment

Figure 16B:
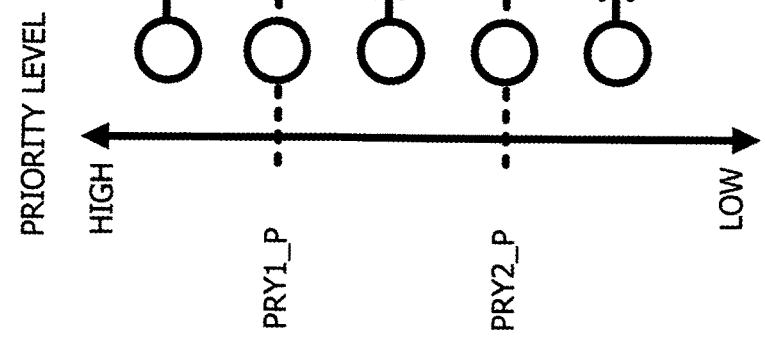
FIGS. 16A and 16B are views illustrating a relationship between normal processes and the polling process according to a third embodiment.
Figure 16A:
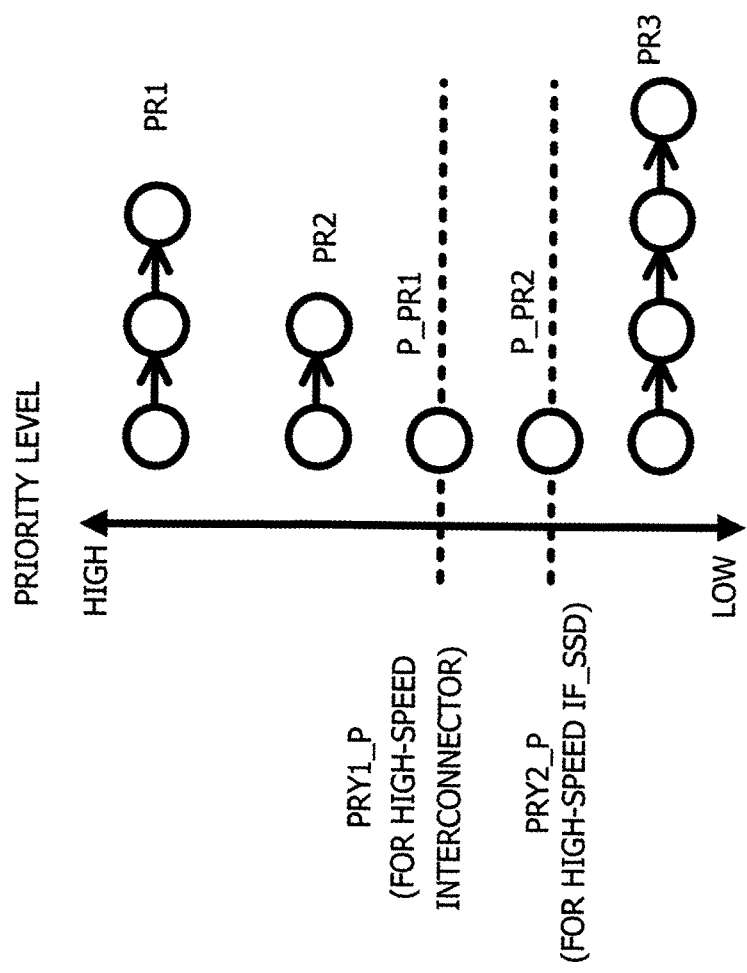

FIGS. 16A and 16B are views illustrating a relationship between normal processes and the polling process according to a third embodiment. In FIGS. 16A and 16B, processes registered in a plurality of RUN queues or a shared RUN queue of a plurality of cores are arranged along the priority level axis. In particular, the polling process includes a polling process P_PR1 for the high-speed interconnector illustrated in FIG. 2 and a polling process P_PR2 for a high-speed interface SSD. Both polling processes have a higher execution priority level than the process PR3, while the polling process P_PR1 for the high-speed interconnector is set to have a higher execution priority level PRY1_P than the polling process P_PR2 for the high-speed interface SSD.

In FIG. 16A, the polling process P_PR1 for the high-speed interconnector and the polling process P_PR2 for the high-speed interface SSD are set at adjacent execution priority levels PRY1_P and PRY2_P. In FIG. 16B, on the other hand, the polling process P_PR1 for the high-speed interconnector is set at a higher execution priority level PRY1_P than the process PR2, whereas the polling process P_PR2 for the high-speed interface SSD is set at a lower execution priority level PRY2_P than the process PR2.

Hence, in FIGS. 16A and 16B, under the control of the process scheduler and the dispatcher, when neither of the processes PR1, PR2 is registered in the RUN queues of the two cores, for example, the two cores respectively execute two polling processes P_PR1, P_PR2. In this case, the I/O request issued to the high-speed interconnector and the I/O request issued to the high-speed interface SSD are both I/O requests with the polling process.

Further, in FIG. 16A, when either the process PR1 or the process PR2 is registered in a RUN queue, the two cores respectively execute the registered process PR1 or PR2 and the polling process P_PR1 for the high-speed interconnector, which has the higher execution priority level PRY1_P. In this case, the polling process P_PR2 for the high-speed interface SSD is not executed, and therefore the I/O request issued to the high-speed interface SSD is an I/O request with a CPU interrupt.

Similarly, in FIG. 16B, when one process PR1 is registered in a RUN queue, the two cores respectively execute the process PR1 and the polling process P_PR1 for the high-speed interconnector, while the polling process P_PR2 for the high-speed interface SSD is not executed. Further, the polling processes P_PR1, P_PR2 are executed or not executed in a similar manner when the process PR1 is not registered in a RUN queue but at least one process PR2 is registered.

By setting a plurality of polling processes corresponding to I/O requests issued respectively to a plurality of peripheral devices at different execution priority levels in this manner, the I/O drivers can issue the I/O request with the polling process in response to the respective I/O requests from the cores with different frequencies or probabilities. As a result, the I/O processing speed of each of the plurality of peripheral devices can be adjusted to a desired speed.

Fourth Embodiment

FIG. 17 is a view illustrating a relationship between normal processes and the polling process according to a fourth embodiment. In FIG. 17, processes registered in a plurality of RUN queues or a shared RUN queue of a plurality of cores are arranged along the priority level axis. In this example, a plurality of task structures of the polling process P_PR are set at the same execution priority level PRY_P. In this case, the probability with which one of the plurality of cores executes the polling process P_PR increases. Further, when a plurality of cores execute the polling process P_PR, even if the polling process underway in one of the cores is interrupted by the process scheduler and switched to another process, the polling process can be continued by another core.

In FIG. 17, the plurality of polling processes having the execution priority level PRY_P may include polling process P_PR1, P_PR2, P_PR3 corresponding to I/O requests addressed to the plurality of peripheral devices. In this case, when the processes PR1, PR2 do not exist, the three types of polling processes P_PR1, P_PR2, P_PR3 are executed by three or more cores or a part of the three types of polling processes may be executed by the three or more cores in accordance with the number of processes PR1, PR2.

Fifth Embodiment

Figure 18A:
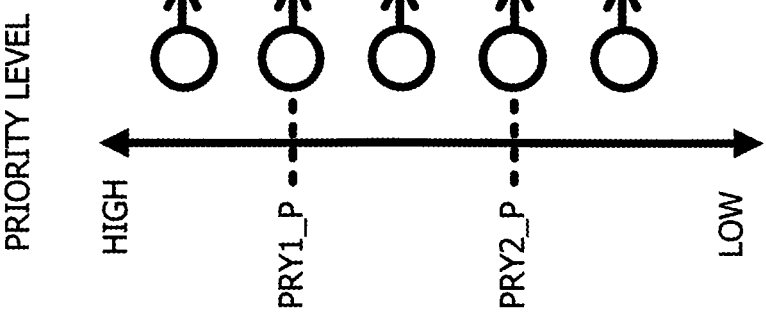
FIGS. 18A and 18B are views illustrating a relationship between normal processes and the polling process according to a fifth embodiment.
Figure 18B:
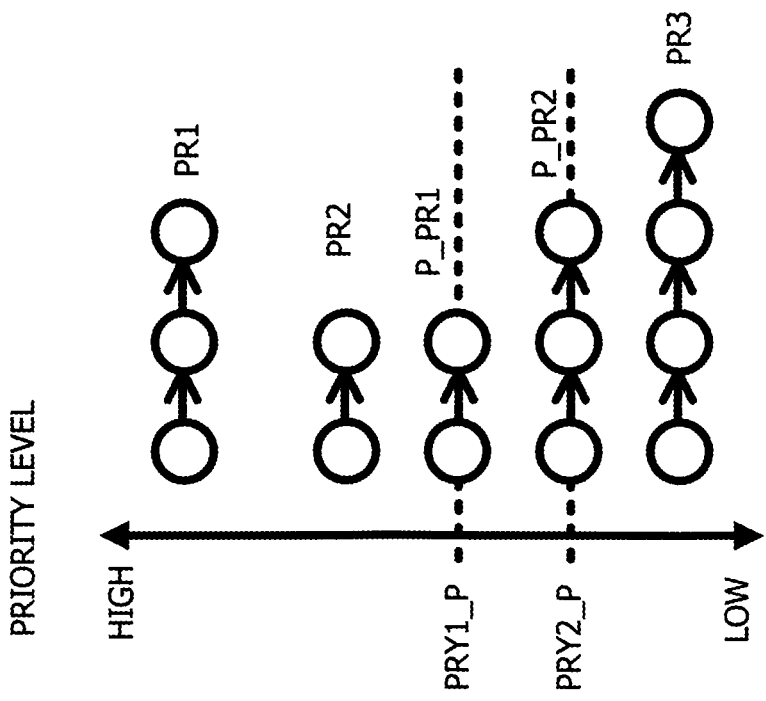

FIGS. 18A and 18B are views illustrating a relationship between normal processes and the polling process according to a fifth embodiment. FIGS. 18A and 18B depict processes registered in a plurality of RUN queues or a shared RUN queue of a plurality of cores.

In the example illustrated in FIG. 18A, a plurality of task structures of a first polling process P_PR1 are set at an execution priority level PRY1_P, and a plurality of task structures of a second polling process P_PR2 are set at a different execution priority level PRY2_P. Further, the example illustrated in FIG. 18B is similar to FIG. 18A except that the execution priority level PRY1_P is higher than the execution priority level of the process PR2 whereas the execution priority level PRY2_P is lower than the execution priority level of the process PR2.

In other words, the fifth embodiment is an example in which the fourth embodiment of FIG. 17 (in which a plurality of polling processes or a plurality of task structures are set at the same execution priority level) is applied to the third embodiment of FIGS. 16A and 16B.

According to the first to fifth embodiments, as described above, when the core of the processor is capable of executing the polling process, I/O processing is performed by means of the polling process so that the I/O processing can be performed at high speed. When the core of the processor is not capable of executing the polling process, on the other hand, I/O processing is performed by means of a CPU interrupt so that I/O processing for the I/O request can be executed by the CPU interrupt, albeit at low speed.

Whether or not the core of the processor can execute the polling process is dependent on the execution priority level set in the polling process, and therefore, by setting an appropriate execution priority level, optimum I/O processing corresponding to the level of the load on the core or cores of the processor can be executed.

According to the first aspect, an information processing device that achieves high-speed I/O processing and high processing efficiency in a CPU can be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor having a plurality of processor cores each of which loads data and executes an arithmetic process to the data, and being enable to access the memory, the plurality of processor cores respectively:
   executes processes to be executed by the plurality of processor cores in accordance with execution priority levels of the processes;
   when determining that a polling process, which repeatedly determines, by means of polling, whether or not reception data for input/output processing is received, is underway in one of the plurality of processor cores, executes the input/output processing in response to a determination, made by the polling process, that the reception data have been received; and
   when determining that the polling process is not underway in any of the plurality of processing cores, executes the input/output processing in response to a processor interrupt issued upon reception of the reception data.

2. The information processing device according to claim 1, wherein the plurality of processor cores respectively:
   when determining that the polling process is underway in one of the plurality of processor cores, issues an input/output request with the polling process to an input/output request destination; and
   when determining that the polling process is not underway in any of the plurality of processing cores, issues an input/output request with the processor interrupt to the input/output request destination.

3. The information processing device according to claim 1, wherein
   the polling process is set at one of a plurality of the execution priority levels, and
   the plurality of processor cores respectively does not execute the polling process when processes having a higher execution priority level than an execution priority level of the polling process are underway in all of the plurality of processor cores, and executes the polling process when a process having a higher execution priority level than the execution priority level of the polling process is not underway in at least one of the plurality of processor cores.

4. The information processing device according to claim 1, wherein
   the polling process is set at a lowest execution priority level among a plurality of the execution priority levels, and
   the plurality of processor cores respectively does not execute the polling process when processes other than the polling process are underway in all of the plurality of processor cores, and executes the polling process when a process other than the polling process is not underway in at least one of the plurality of processor cores.

5. The information processing device according to claim 1, wherein
   the plurality of processor cores respectively:
   determines whether or not the polling process is underway in any of the plurality of processor cores in response to generation of an input/output request;
   issues an input/output request with the polling process to a request destination when the polling process is underway; and
   issues an input/output request with the processor interrupt to the request destination when the polling process is not underway.

6. The information processing device according to claim 5, wherein the plurality of processor cores respectively:
   when the input/output request for the polling process is issued, executes the input/output processing in response to a determination that the reception data are received in a first reception queue which is a polling destination of the polling process; and
   when the input/output request with the processor interrupt is issued, executes the input/output processing in response to the processor interrupt, which is issued upon reception of the reception data in a second reception queue that corresponds to the input/output request with the processor interrupt.

7. The information processing device according to claim 2, wherein the plurality of processor cores respectively executes a plurality of polling processes respectively corresponding to a plurality of input/output request destinations of the input/output requests at different execution priority levels.

8. The information processing device according to claim 1, wherein the plurality of processor cores respectively:
   registers the processes to be executed in a run queue in accordance with the execution priority levels of the processes; and
   executes the processes registered in the run queue in accordance with the execution priority levels.

9. The information processing device according to claim 8, wherein the plurality of processor cores respectively registers a plurality of polling processes corresponding respectively to a plurality of request destinations of the input/output requests in the run queue at different execution priority levels.

10. A method of information processing of an information processing device comprising:
    the information processing device including a memory and a processor that has a plurality of processor cores each of which loads data and executes an arithmetic process to the data, and is enable to access the memory, by the plurality of processor cores respectively,
    executing processes to be executed by the plurality of processor cores in accordance with execution priority levels of the processes;
    when determining that a polling process, which repeatedly determines, by means of polling, whether or not reception data for input/output processing is received, is underway in one of the plurality of processor cores, executing the input/output processing in response to a determination, made by the polling process, that the reception data have been received; and when determining that the polling process is not underway in any of the plurality of processing cores, executing the input/output processing in response to a processor interrupt issued upon reception of the reception data.

11. A non-transitory computer readable storage medium that stores therein a program causing a plurality of processor cores to execute a process comprising:

a processor including the plurality of processor cores respectively loading data and executing an arithmetic process to the data, and being enable to access a memory, executing processes to be executed by the plurality of processor cores in accordance with execution priority levels of the processes;

when determining that a polling process, which repeatedly determines, by means of polling, whether or not reception data for input/output processing is received, is underway in one of the plurality of processor cores, executing the input/output processing in response to a determination, made by the polling process, that the reception data have been received; and when determining that the polling process is not underway in any of the plurality of processing cores, executing the input/output processing in response to a processor interrupt issued upon reception of the reception data.

* * * * *